(12) United States Patent
Kosugi

(10) Patent No.: US 7,912,613 B2
(45) Date of Patent: Mar. 22, 2011

(54) RIDING TYPE VEHICLE

(75) Inventor: Makoto Kosugi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 916 days.

(21) Appl. No.: 10/591,285

(22) PCT Filed: Jun. 30, 2005

(86) PCT No.: PCT/JP2005/012108
§ 371 (c)(1),
(2), (4) Date: Jun. 18, 2007

(87) PCT Pub. No.: WO2006/004008
PCT Pub. Date: Jan. 12, 2006

(65) Prior Publication Data
US 2008/0021621 A1 Jan. 24, 2008

(30) Foreign Application Priority Data
Jul. 1, 2004 (JP) .................. 2004-195630

(51) Int. Cl.
*G06F 17/00* (2006.01)
*B60W 10/02* (2006.01)

(52) U.S. Cl. ............... 701/51; 701/52; 701/54; 701/55; 701/56; 701/64; 701/67; 477/166; 477/171; 477/174; 477/180; 477/181; 192/3.51; 192/3.55; 192/3.58; 192/20; 192/30 R; 180/292; 180/293; 180/294

(58) Field of Classification Search .............. 701/51, 701/52, 54–56, 64, 67; 477/166–181; 192/3.51, 192/3.55, 3.58, 20, 30; 180/292–294
See application file for complete search history.

(56) References Cited

U.S. PATENT DOCUMENTS

| 1,500,878 | A | 7/1924 | Kruchten |
| 5,121,649 | A | 6/1992 | Randriazanamparany et al. |
| 6,186,923 | B1 * | 2/2001 | Popp et al. ............ 477/115 |
| 6,364,809 | B1 * | 4/2002 | Cherry .................... 477/86 |
| H2031 | H | 6/2002 | Harrell et al. |
| 6,481,554 | B1 | 11/2002 | Ota et al. |
| 6,502,681 | B1 | 1/2003 | Ota et al. |

(Continued)

FOREIGN PATENT DOCUMENTS

DE 4336445 4/1995

(Continued)

OTHER PUBLICATIONS

Co-Pending U.S. Appl. No. 11/514,387, filed Aug. 31, 2006. Title: Clutch Failure Detector, Automatic Clutch System, and Straddle-Type Vehicle.

(Continued)

*Primary Examiner* — Jack Keith
*Assistant Examiner* — Chuong P Nguyen
(74) *Attorney, Agent, or Firm* — Keating & Bennett, LLP

(57) ABSTRACT

A riding type vehicle includes an automatic transmission capable of executing a shift change by a clutch actuator and a shift actuator. A clutch is controlled by the clutch actuator and is a multiplate clutch. The multiplate clutch is provided with bias member configured to enlarge a partial clutch engagement region of the clutch. The multiplate clutch is configured such that during shift change, both of the clutch actuator and the shift actuator are controlled to operate in overlapping manner.

15 Claims, 25 Drawing Sheets

U.S. PATENT DOCUMENTS

| | | | |
|---|---|---|---|
| 6,524,224 B2 * | 2/2003 | Gagnon et al. | 477/175 |
| 6,942,598 B2 * | 9/2005 | Kondo et al. | 477/169 |
| 2004/0118652 A1 | 6/2004 | Muetzel et al. | |
| 2005/0167232 A1 * | 8/2005 | Kosugi et al. | 192/85 R |
| 2006/0094567 A1 | 5/2006 | Kosugi et al. | |
| 2006/0124422 A1 | 6/2006 | Zenno | |
| 2006/0128525 A1 | 6/2006 | Zenno | |
| 2006/0128527 A1 | 6/2006 | Zenno et al. | |
| 2006/0160660 A1 | 7/2006 | Zenno et al. | |
| 2006/0169561 A1 | 8/2006 | Ooishi et al. | |
| 2006/0169562 A1 | 8/2006 | Kosugi | |
| 2006/0169569 A1 | 8/2006 | Ooishi et al. | |
| 2007/0267240 A1 * | 11/2007 | Inui et al. | 180/291 |

FOREIGN PATENT DOCUMENTS

| | | |
|---|---|---|
| DE | 19709419 | 10/1997 |
| DE | 19853333 | 6/1999 |
| DE | 10107962 | 8/2002 |
| DE | 10327438 | 1/2004 |
| DE | 10304588 | 4/2004 |
| DE | 10253809 A1 | 5/2004 |
| DE | 10306934 | 9/2004 |
| DE | 10393681 | 10/2005 |
| EP | 0129417 | 6/1984 |
| EP | 0328362 | 8/1989 |
| EP | 0590240 | 4/1994 |
| EP | 0635391 | 7/1994 |
| EP | 0887220 | 6/1998 |
| EP | 0987467 | 7/1999 |
| EP | 1122116 | 1/2001 |
| EP | 1342930 A2 | 3/2003 |
| EP | 1365176 | 5/2003 |
| EP | 1555461 | 10/2003 |
| EP | 1469236 | 4/2004 |
| EP | 1666772 | 8/2005 |
| FR | 0 490 730 A1 | 6/1992 |
| GB | 2170571 | 1/1986 |
| JP | 43-11555 | 5/1968 |
| JP | 58-152938 | 9/1983 |
| JP | 60-86631 | 6/1985 |
| JP | 60-156233 | 10/1985 |
| JP | 61-024858 | 2/1986 |
| JP | 62-017631 | 1/1987 |
| JP | 62-80192 | 4/1987 |
| JP | 62-75414 | 5/1987 |
| JP | 62-110532 | 5/1987 |
| JP | 02-118269 | 5/1990 |
| JP | 03-172675 | 7/1991 |
| JP | 03-290030 | 12/1991 |
| JP | 4-266619 | 9/1992 |
| JP | 05-026065 | 2/1993 |
| JP | 05-039865 | 2/1993 |
| JP | 08-061487 | 3/1996 |
| JP | 11-082710 | 3/1999 |
| JP | 3044498 | 3/2000 |
| JP | 2000-205411 | 7/2000 |
| JP | 2001-050389 | 2/2001 |
| JP | 2001-146930 | 5/2001 |
| JP | 2001-173685 | 6/2001 |
| JP | 2001-280493 | 10/2001 |
| JP | 2002-067741 | 3/2002 |
| JP | 2002-243034 | 8/2002 |
| JP | 2003-329064 | 11/2003 |
| JP | 2005-282784 | 10/2005 |
| JP | 2006-017221 | 1/2006 |
| WO | WO 91/10979 | 7/1991 |
| WO | WO 98/24008 | 6/1998 |
| WO | WO 02/25131 | 3/2002 |
| WO | WO 2004/005743 | 1/2004 |
| WO | WO 2004/094177 | 11/2004 |

OTHER PUBLICATIONS

Co-Pending U.S. Appl. No. 11/514,386, filed Aug. 31, 2006. Title: Clutch Control Device and Vehicle.
Co-Pending U.S. Appl. No. 11/514,000, filed Aug. 31, 2006. Title: Automatic Shift Control Device and Vehicle.
Co-Pending U.S. Appl. No. 11/513,609, filed Aug. 31, 2006. Title: Automated Transmission Controller and Vehicle Including the Automated Transmission Controller.
Co-Pending U.S. Appl. No. 11/514,017, filed Aug. 31, 2006. Title: Automated Transmission Controller and Vehicle Including the Automated Transmission Controller.
Co-Pending U.S. Appl. No. 11/513,537, filed Aug. 31, 2006. Title: Automatic Gearshift Control Device and Vehicle.
Co-Pending U.S. Appl. No. 11/469,268, filed Aug. 31, 2006. Title: Clutch Actuator, Engine Unit, and Straddle Type Vehicle.
Co-Pending U.S. Appl. No. 11/469,310, filed Aug. 31, 2006. Title: Clutch Actuator, Engine Unit, and Straddle Type Vehicle.
Co-Pending U.S. Appl. No. 11/469,228, filed Aug. 31, 2006. Title: Clutch Actuator, Engine Unit, and Straddle Type Vehicle.
Co-Pending U.S. Appl. No. 11/469,252, filed Aug. 31, 2006. Title: Shift Actuator, Vehicle and Method of Integrating Vehicle.
Co-Pending U.S. Appl. No. 10/591,560, filed Aug. 31, 2006. Title: Speed Change Controller for Straddle-Ride Type Vehicles.
Co-Pending U.S. Appl. No. 10/591,559, filed Aug. 31, 2006. Title: Shift Control for Straddle-Type Vehicle, and Straddle-Type Vehicle.
Co-Pending U.S. Appl. No. 10/591,284, filed Aug. 31, 2006. Title: Actuation Force Transmission Mechanism and Straddle-Type Vehicle.
EP Search Report for EP06025732 completed Feb. 9, 2007.
EP Search Report for EP06025981 completed Feb. 16, 2007.
EP Search Report for EP06025877 completed Feb. 12, 2007.
EP Search Report for EP06025982 completed Feb. 6, 2007.
EP Search Report for EP06025609 completed Feb. 5, 2007.
EP Search Report for EP06025607 completed Feb. 5, 2007.
EP Search Report for EP06025606 completed Feb. 5, 2007.
EP Search Report for EP06025734 completed Feb. 8, 2007.
Co-Pending U.S. Appl. No. 11/514,387, filed Aug. 31, 2006. Title: Clutch Failure Detector, Automatic Clutch System, and Straddle-Type Vehicle.
Co-Pending U.S. Appl. No. 11/514,386, filed Aug. 31, 2006. Title: Clutch Control Device and Vehicle.
Co-Pending U.S. Appl. No. 11/514,000, filed Aug. 31, 2006. Title: Automatic Shift Control Device and Vehicle.
Co-Pending U.S. Appl. No. 11/513,609, filed Aug. 31, 2006. Title: Automated Transmission Controller and Vehicle Including the Automated Transmission Controller.
Co-Pending U.S. Appl. No. 11/514,017, filed Aug. 31, 2006. Title: Automated Transmission Controller and Vehicle Including the Automated Transmission Controller.
Co-Pending U.S. Appl. No. 11/513,537, filed Aug. 31, 2006. Title: Automatic Gearshift Control Device and Vehicle.
Co-Pending U.S. Appl. No. 11/469,268, filed Aug. 31, 2006. Title: Clutch Actuator, Engine Unit, and Straddle Type Vehicle.
Co-Pending U.S. Appl. No. 11/469,310, filed Aug. 31, 2006. Title: Clutch Actuator, Engine Unit, and Straddle Type Vehicle.
Co-Pending U.S. Appl. No. 11/469,228, filed Aug. 31, 2006. Title: Clutch Actuator, Engine Unit, and Straddle Type Vehicle.
Co-Pending U.S. Appl. No. 11/469,252, filed Aug. 31, 2006. Title: Shift Actuator, Vehicle and Method of Integrating Vehicle.
Co-Pending U.S. Appl. No. 10/591,560, filed Aug. 31, 2006. Title: Speed Change Controller for Straddle-Ride Type Vehicles.
Co-Pending U.S. Appl. No. 10/591,559, filed Aug. 31, 2006. Title: Shift Control Device for Straddle-Type Vehicle, and Straddle-Type Vehicle.
Co-Pending U.S. Appl. No. 10/591,284, filed Aug. 31, 2006. Title: Actuation Force Transmission Mechanism and Straddle-Type Vehicle.

* cited by examiner

[Fig. 1]
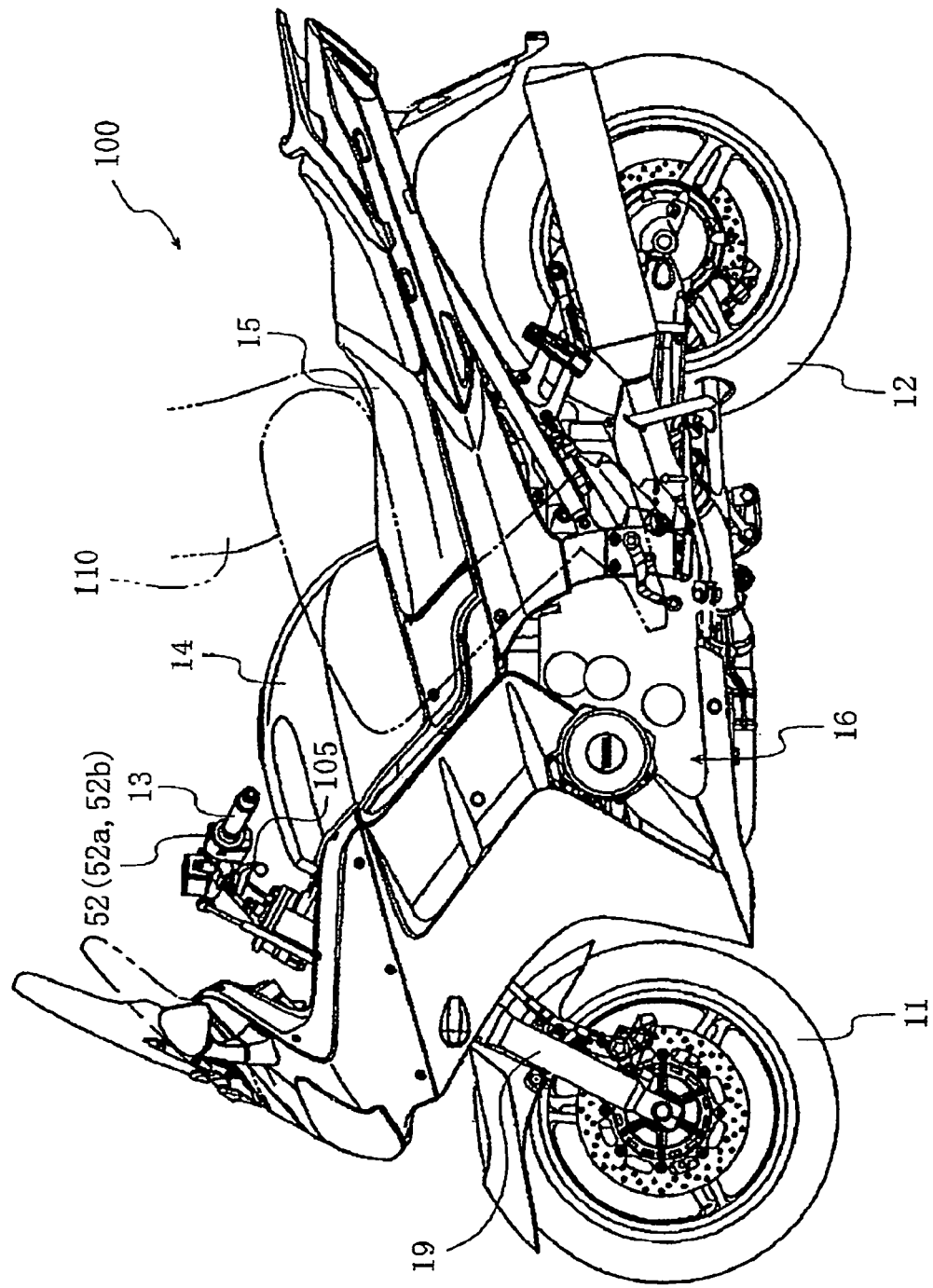

[Fig. 2]
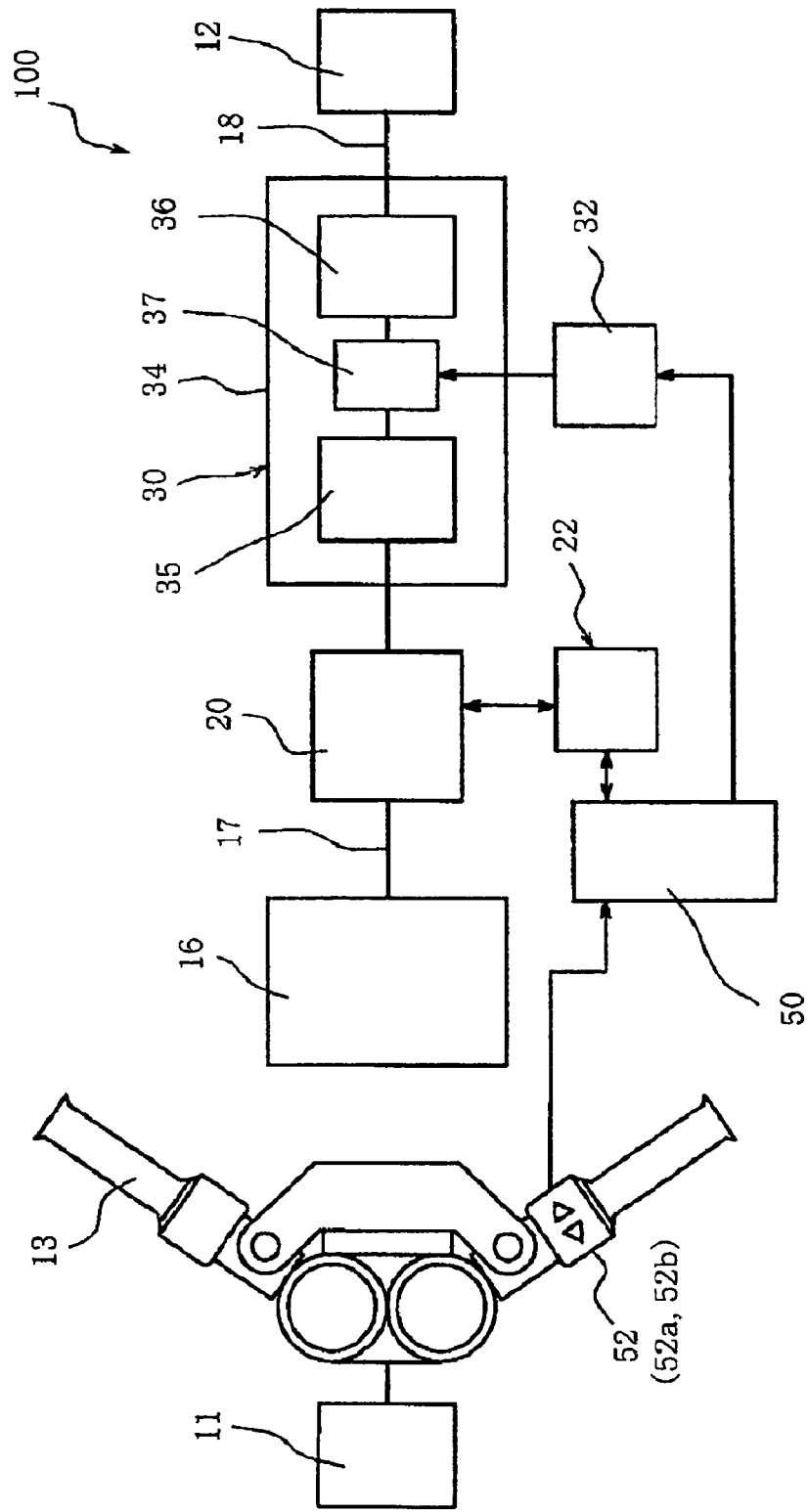

[Fig. 3]
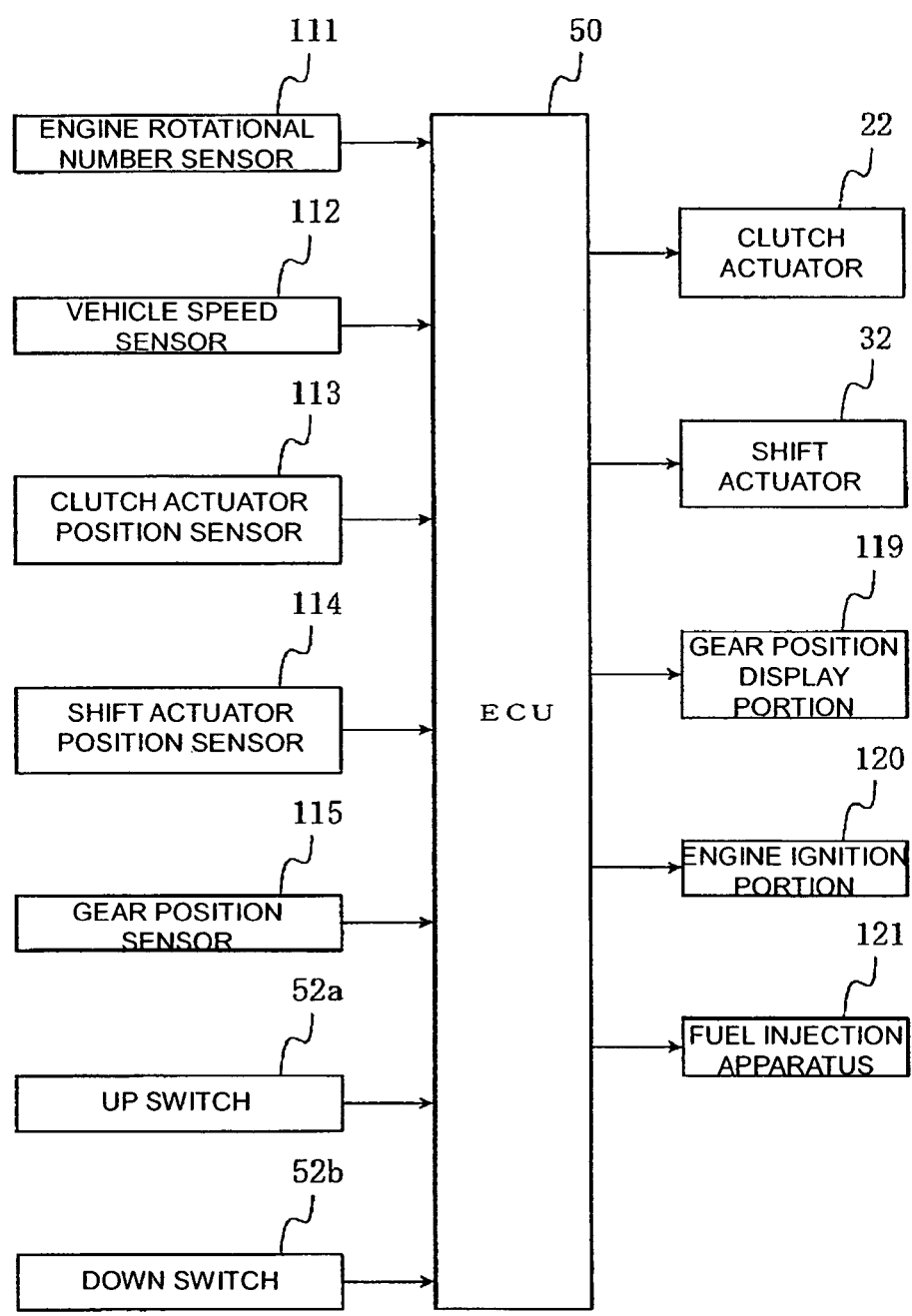

[Fig. 4]
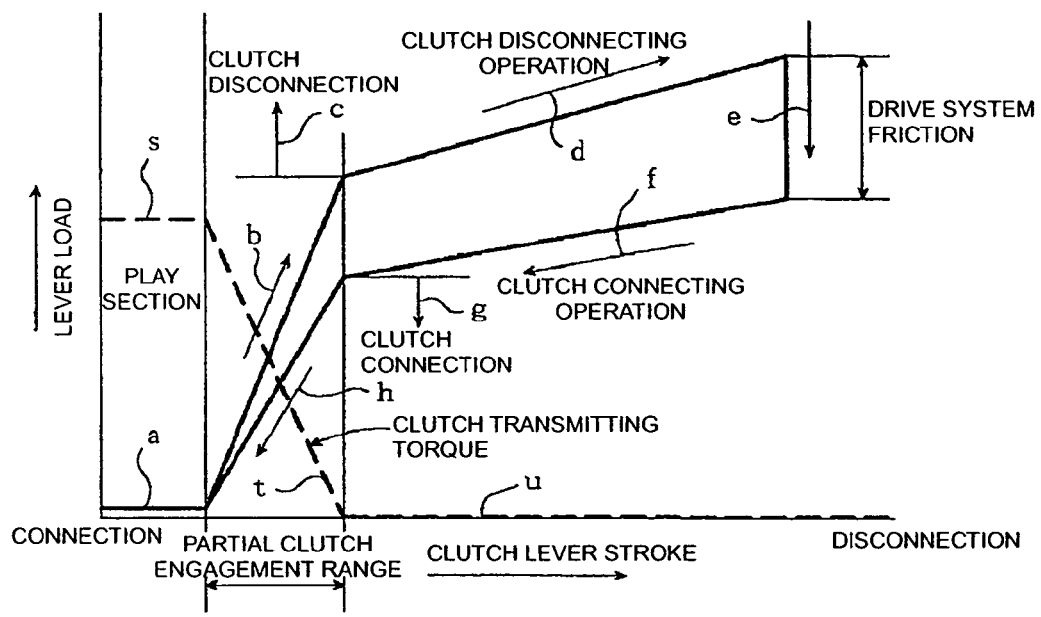

[Fig. 5]
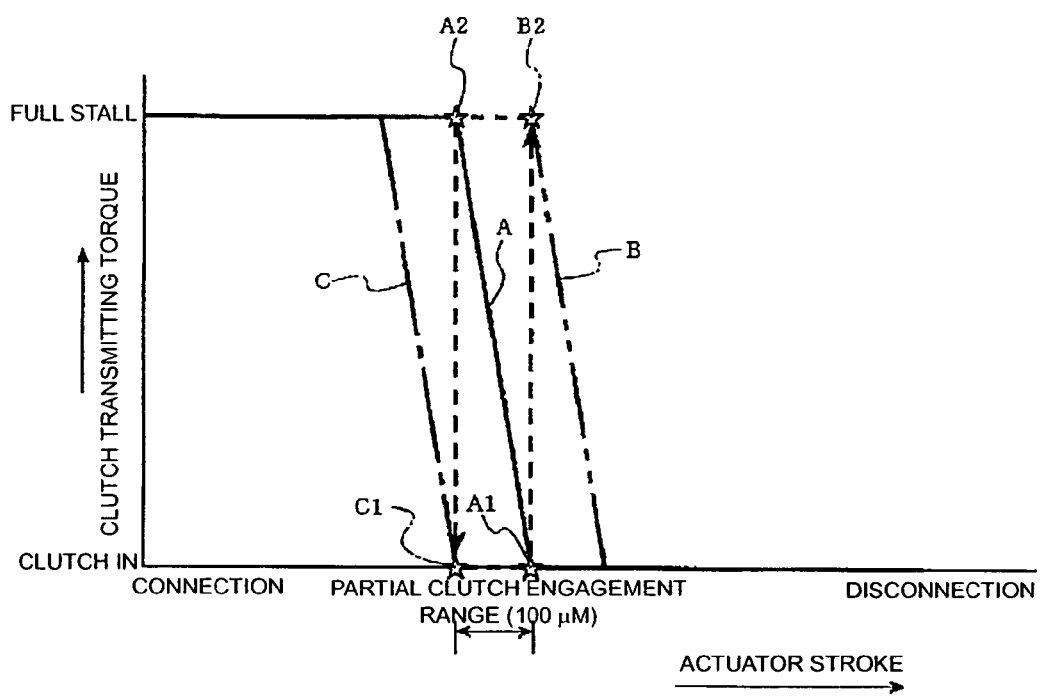

[Fig. 6]
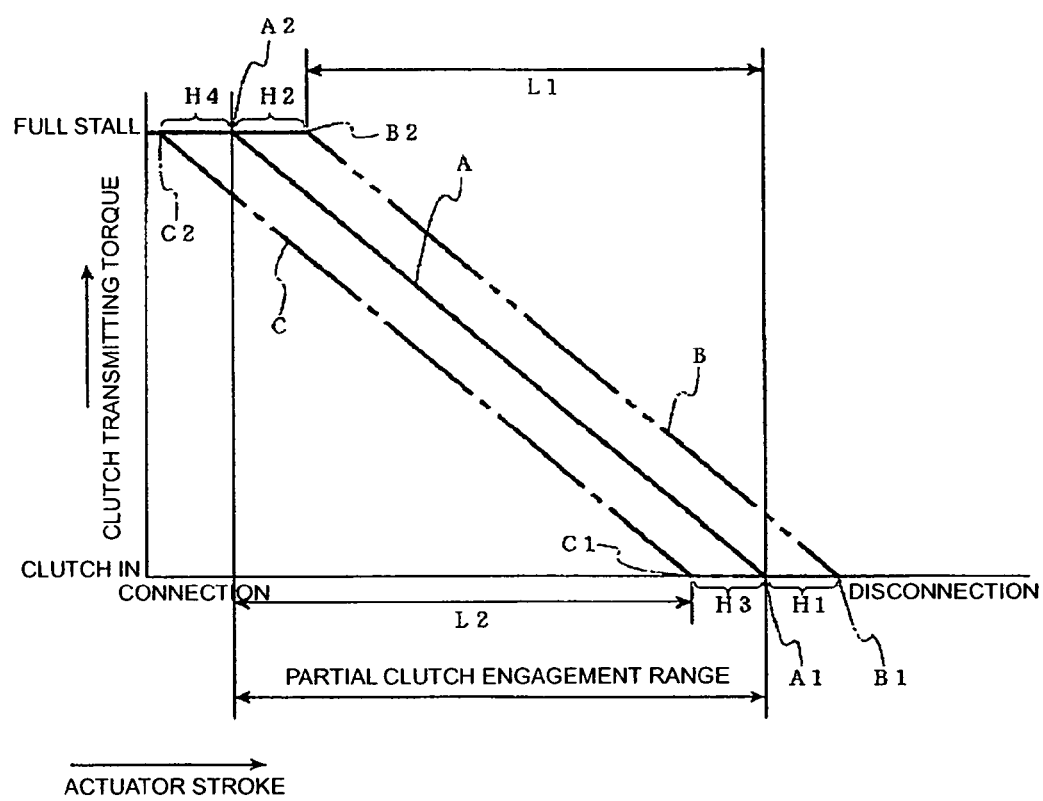

[Fig. 7]
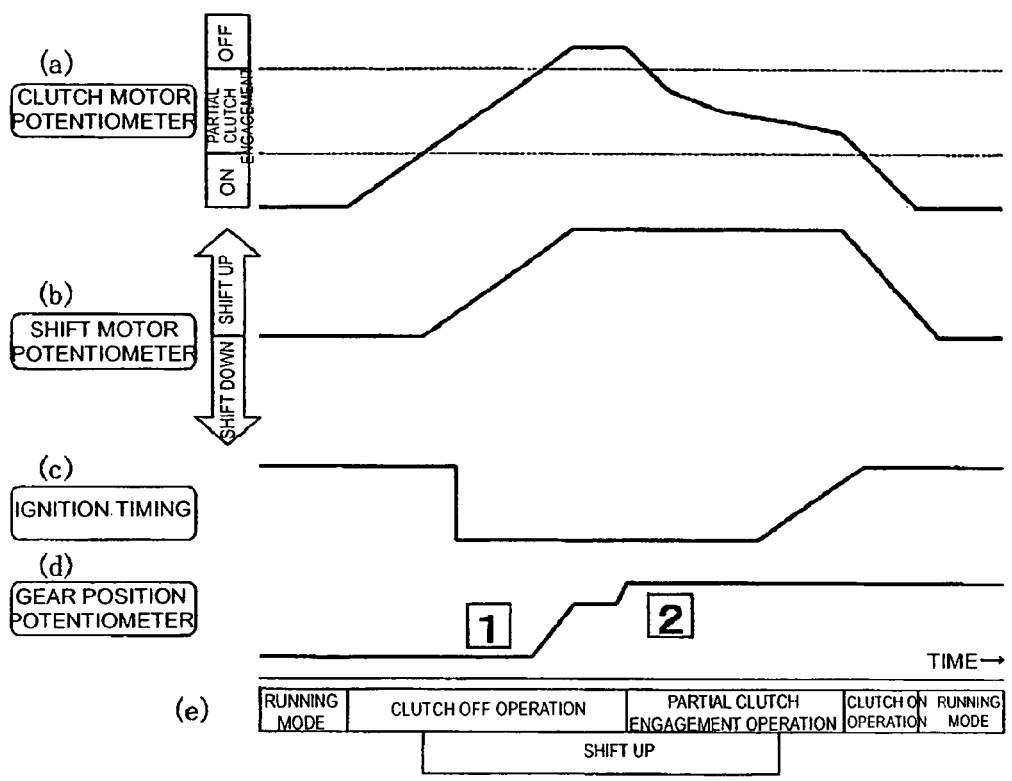

[Fig. 8]
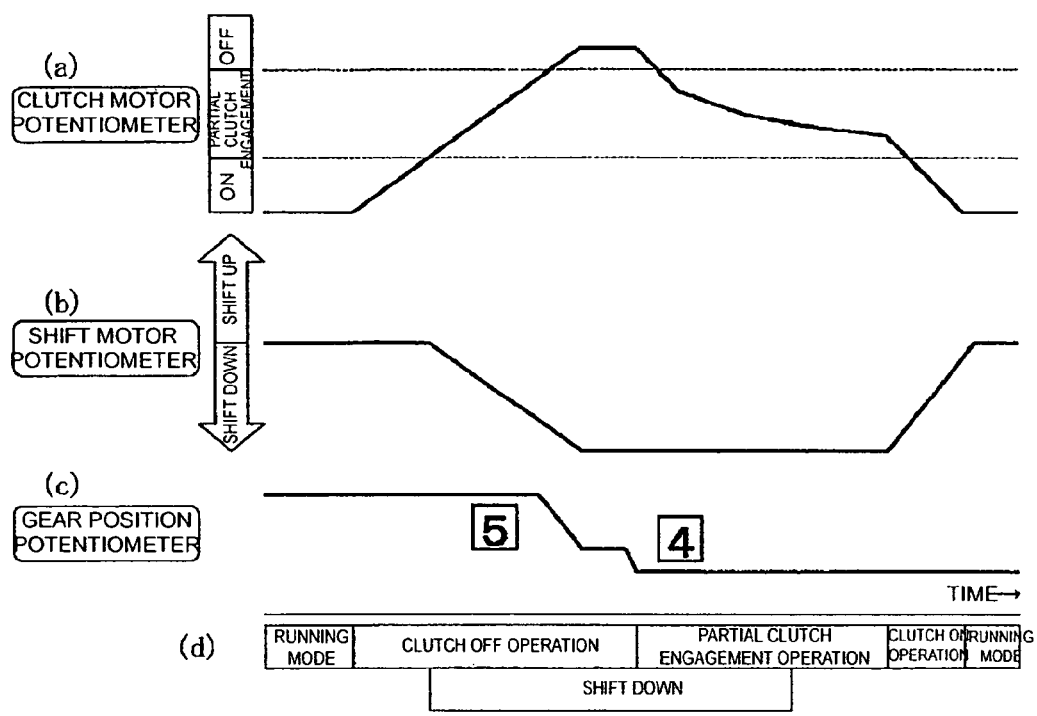

[Fig. 9]
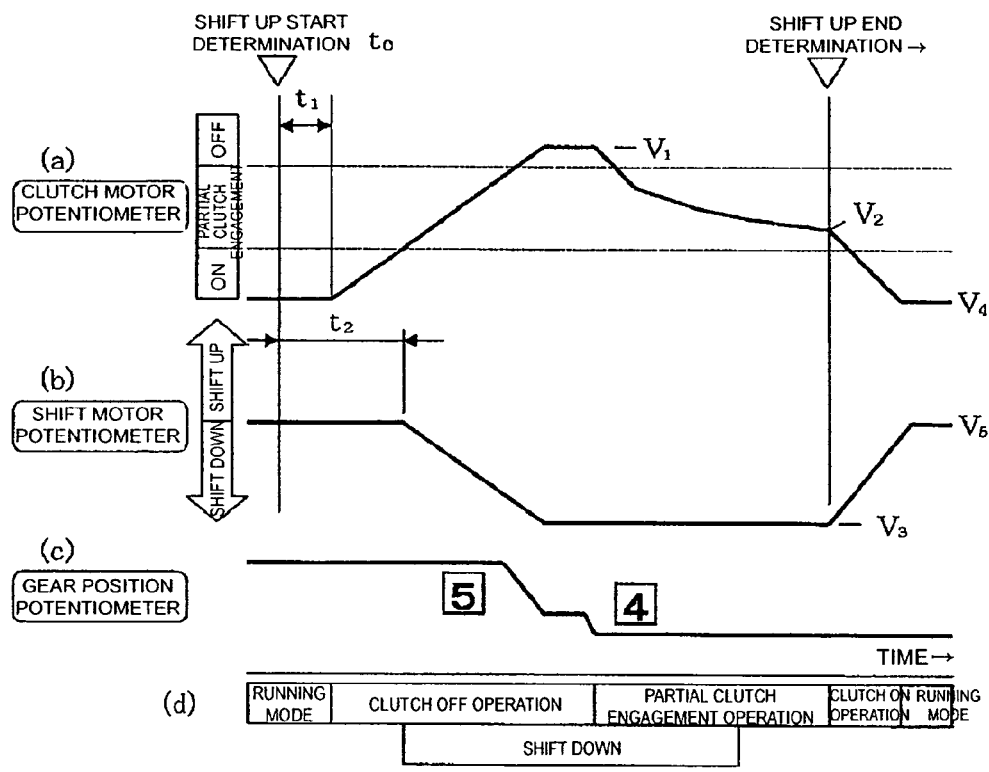

[Fig. 10]
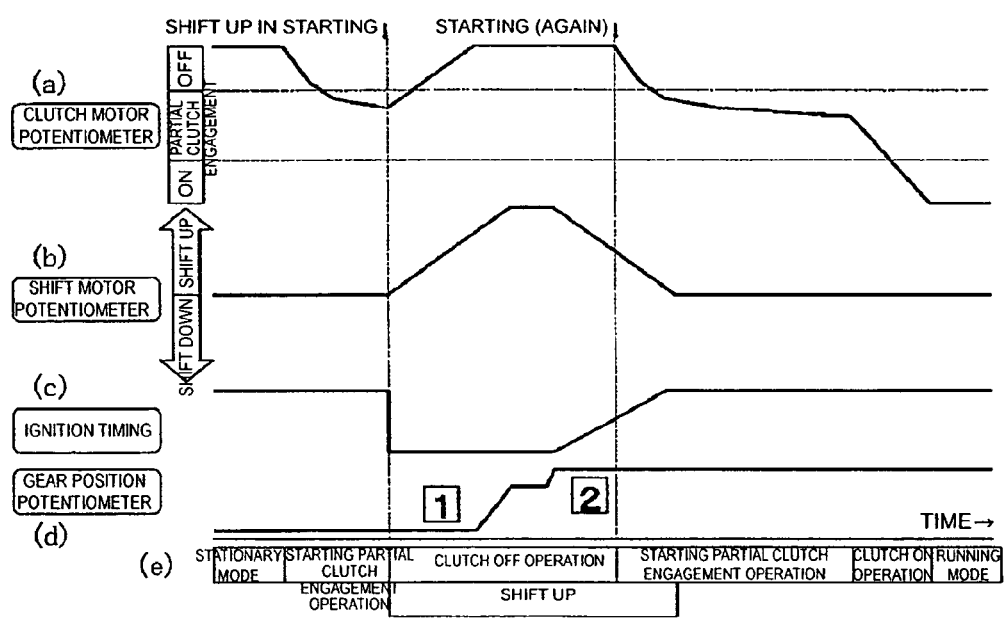

[Fig. 11]
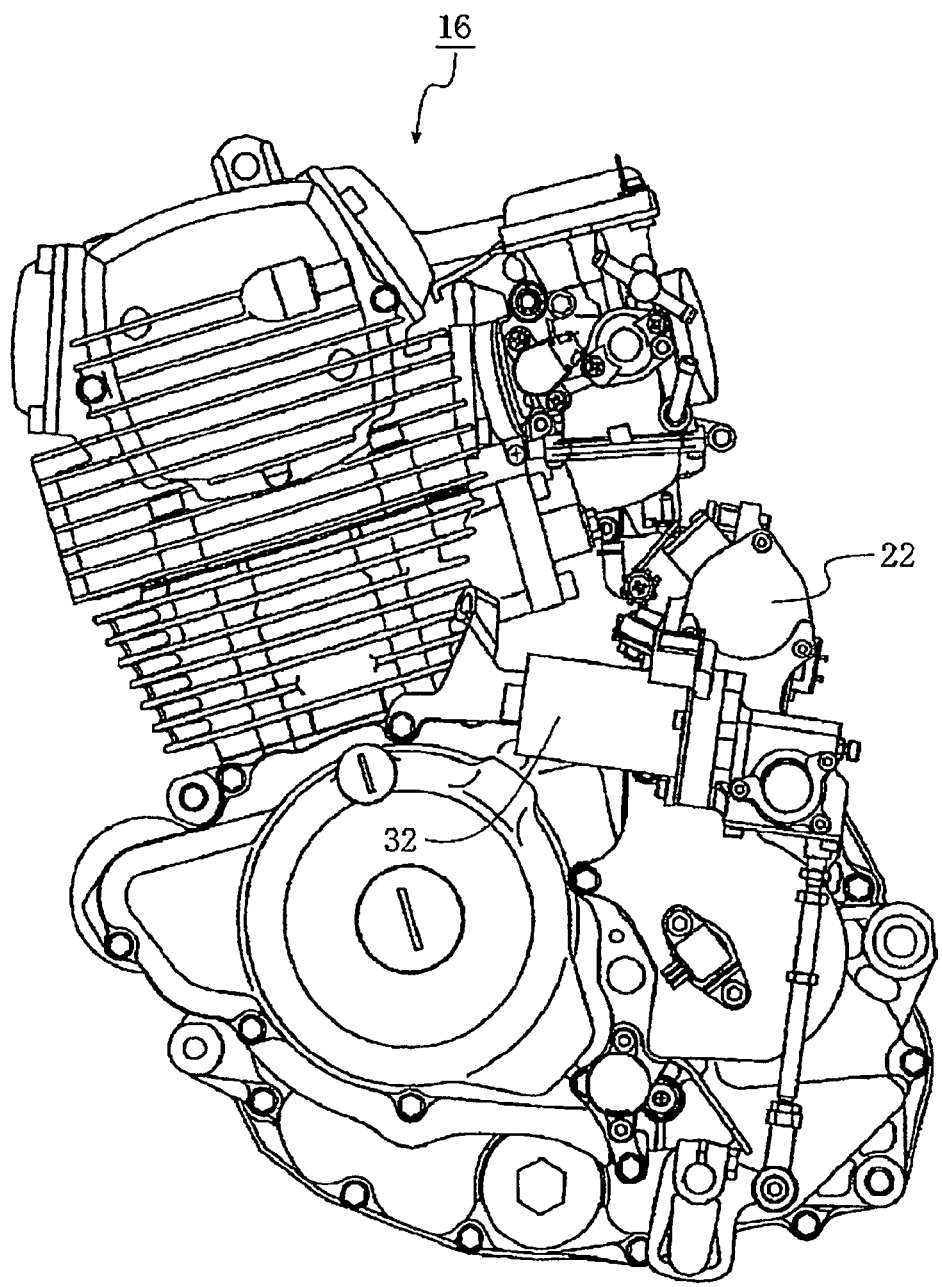

[Fig. 12]
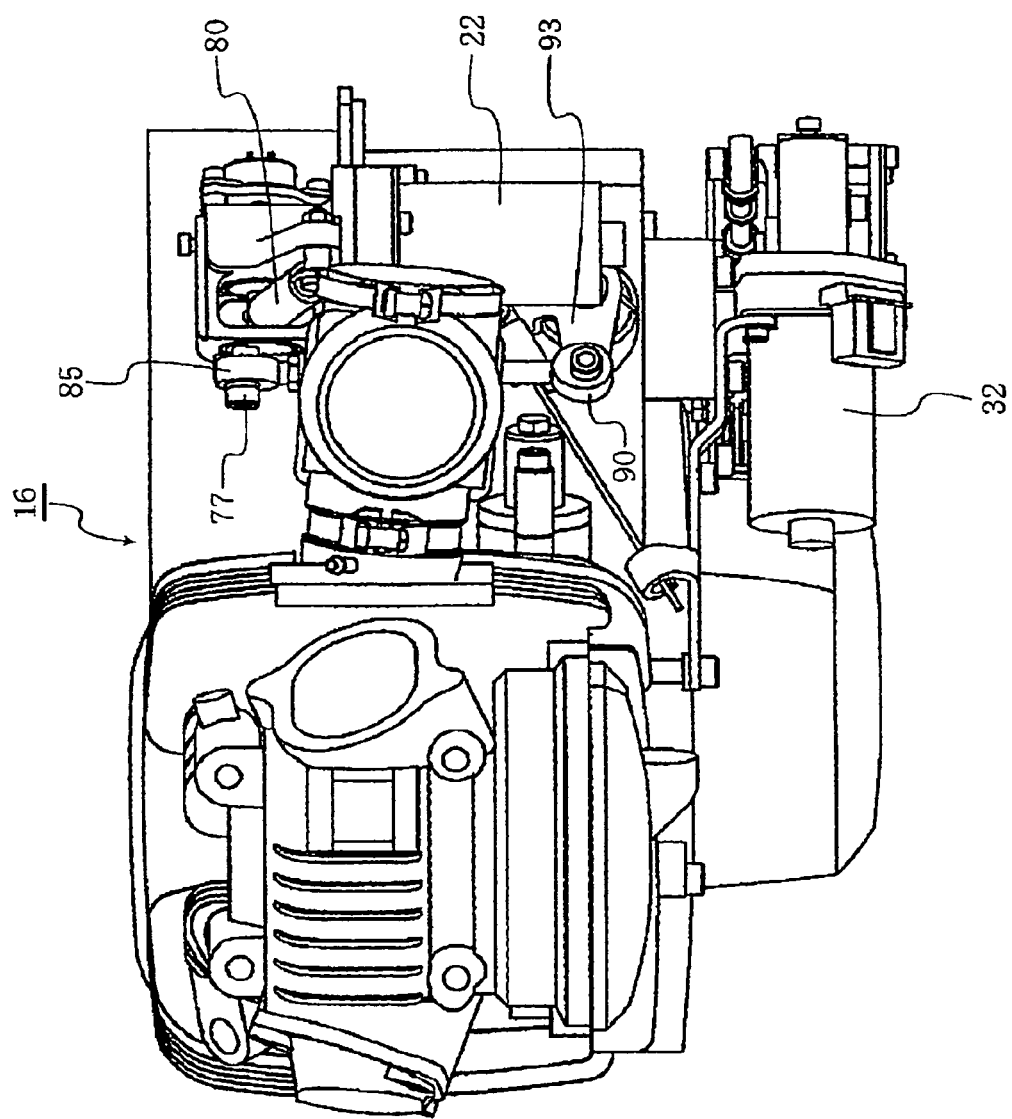

[Fig. 13]
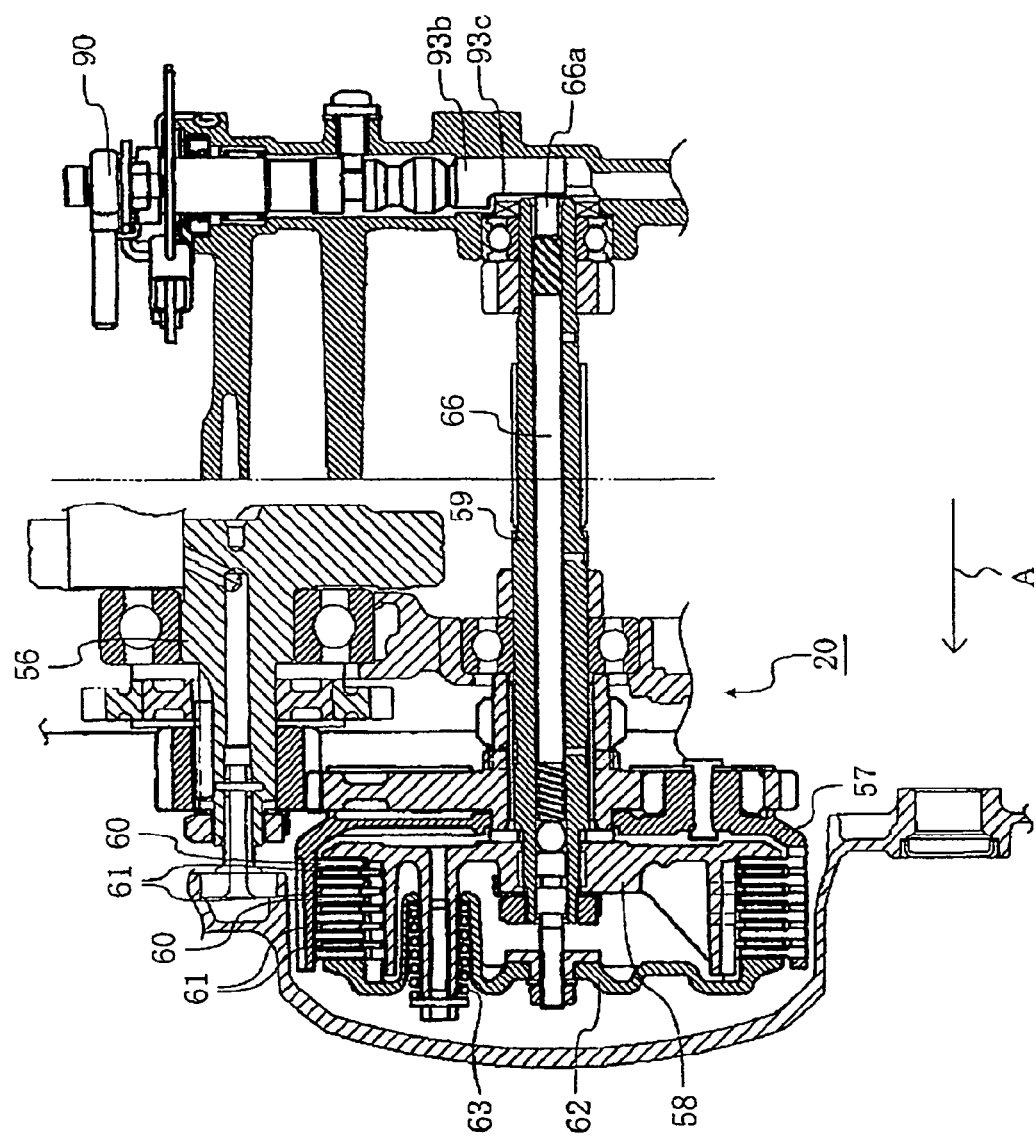

[Fig. 14]
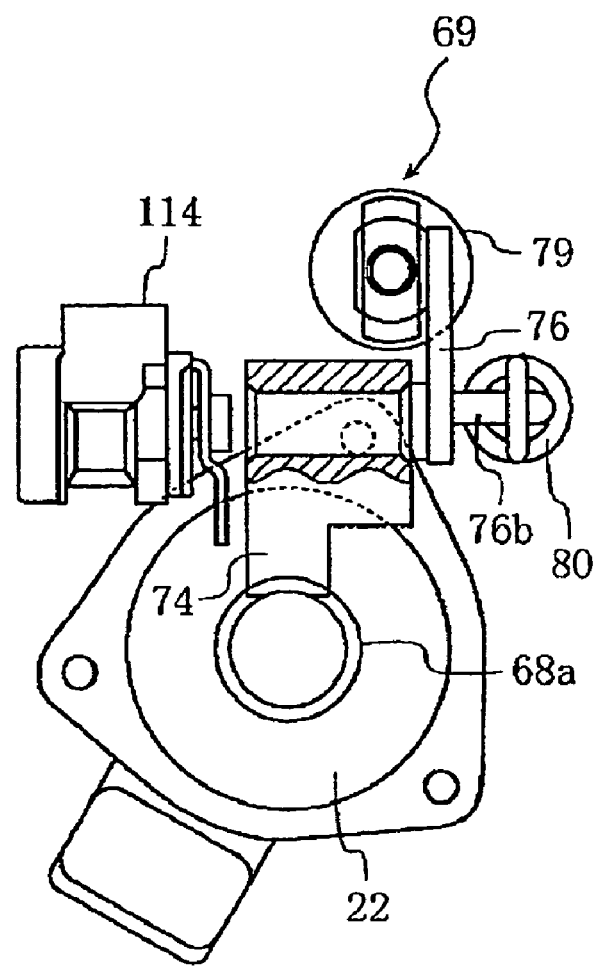

[Fig. 15]
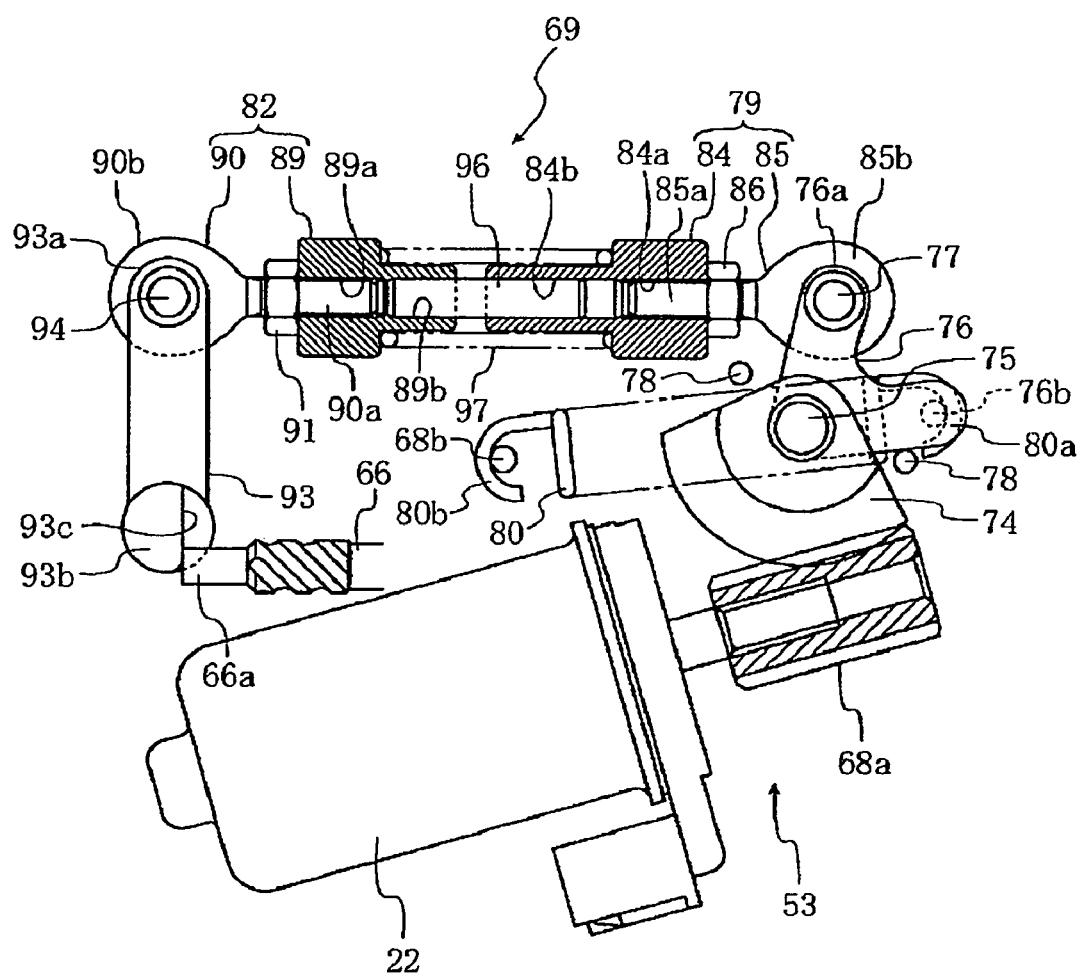

[Fig. 16]
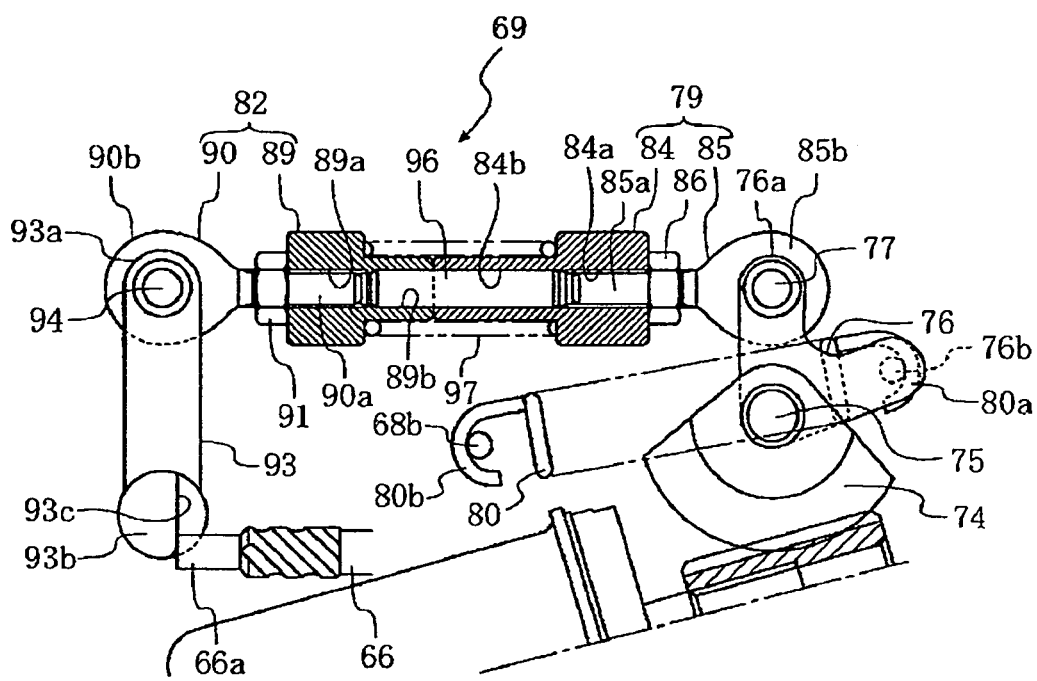

[Fig. 17]
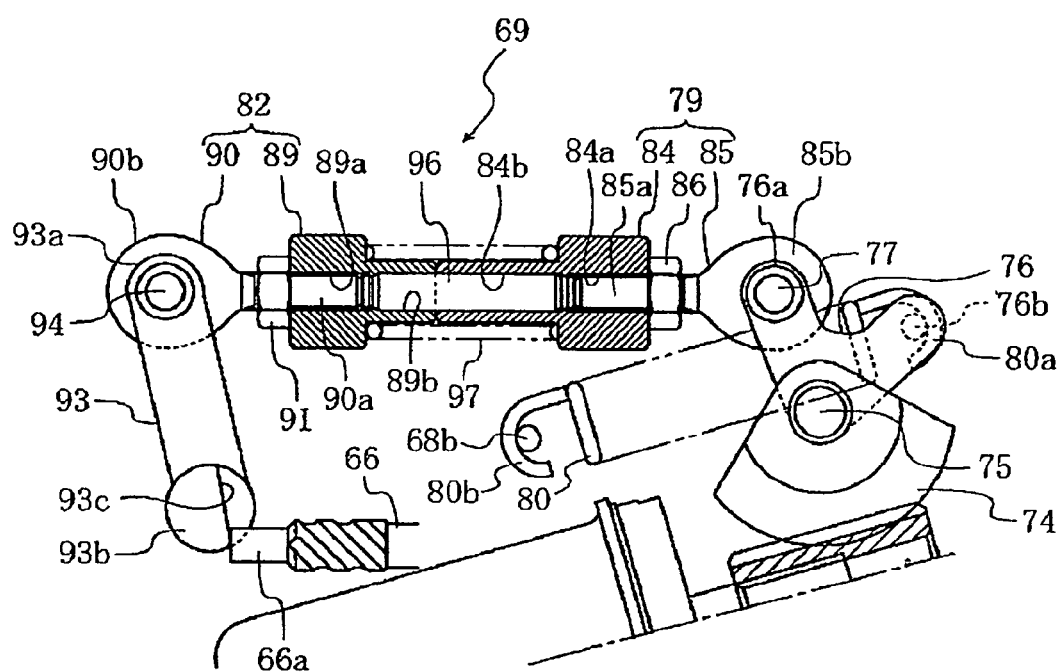

[Fig. 18]
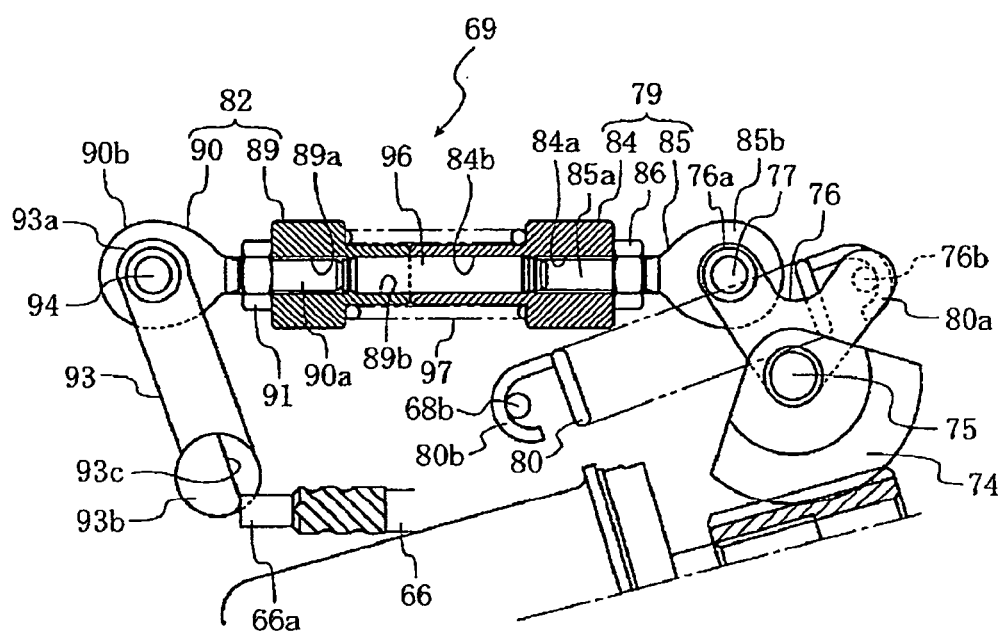

[Fig. 19]
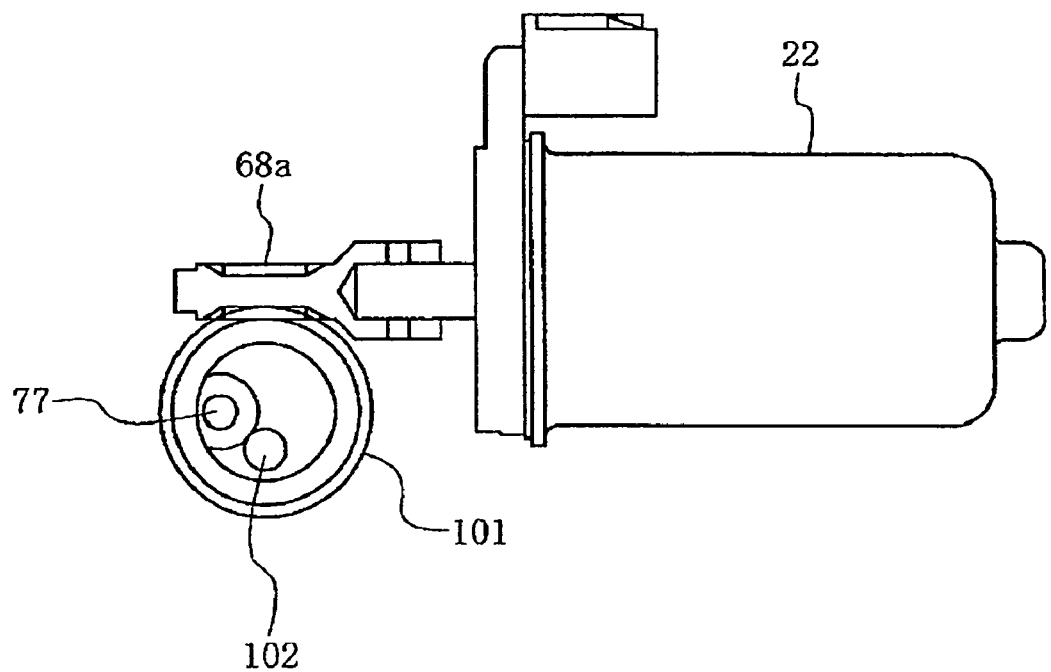

[Fig. 20]
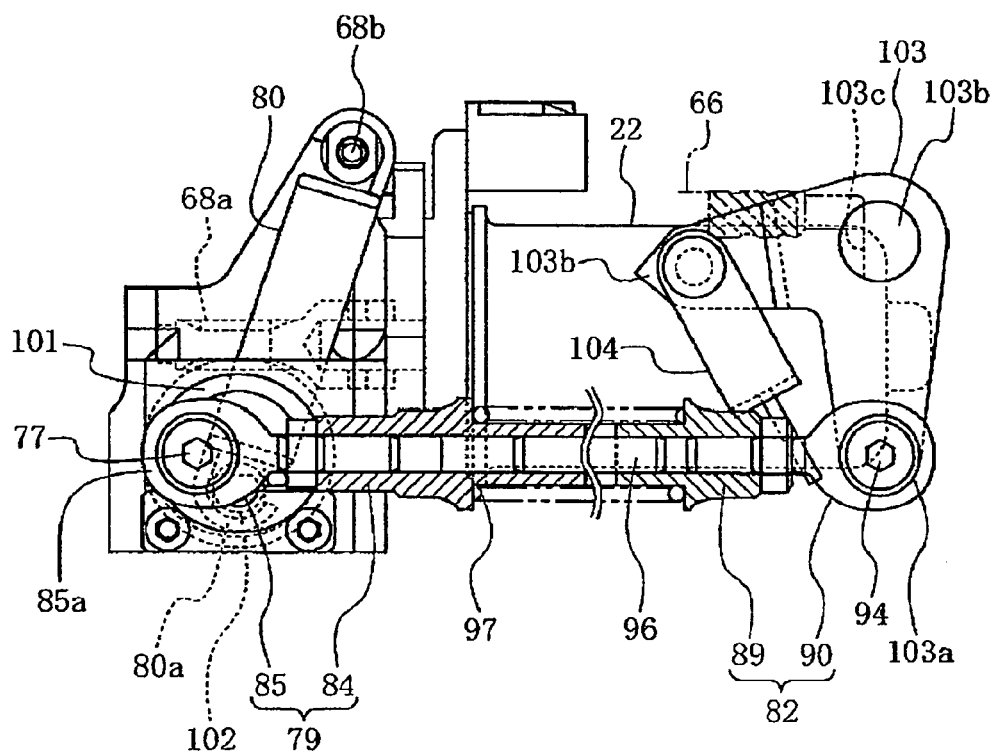

[Fig. 21]
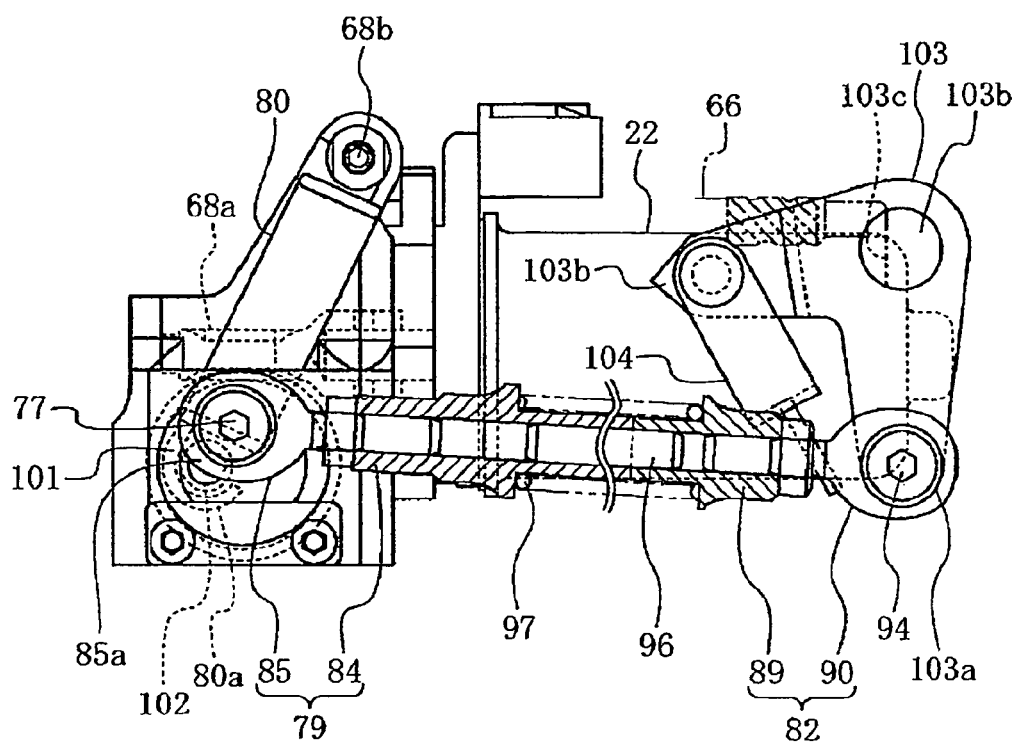

[Fig. 22]
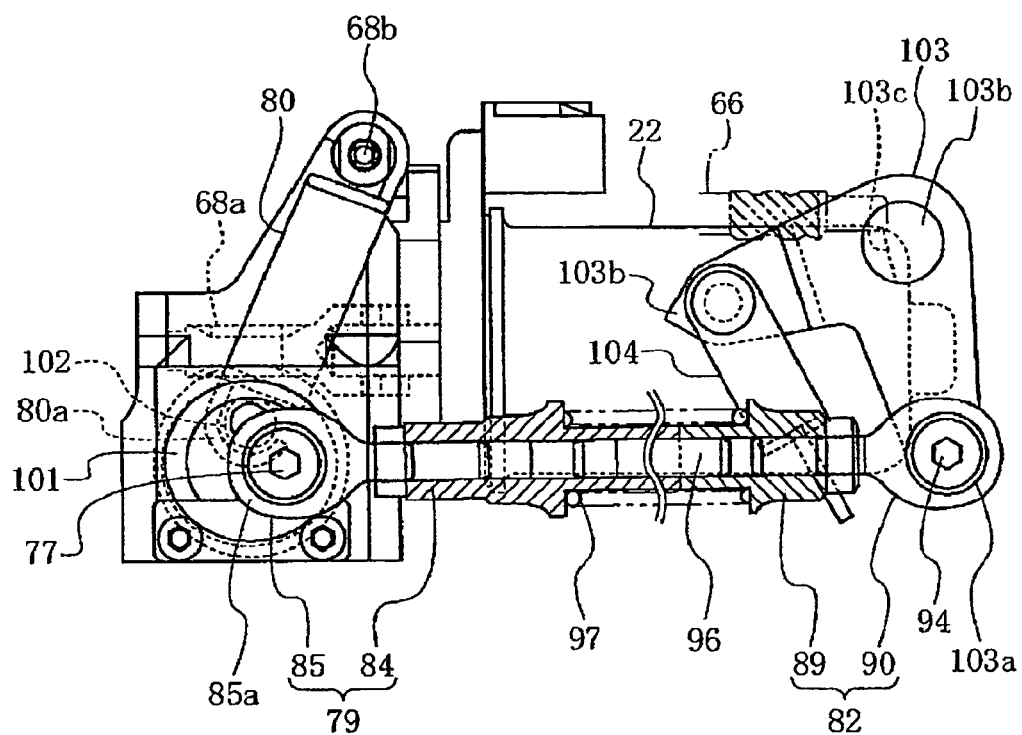

[Fig. 23]
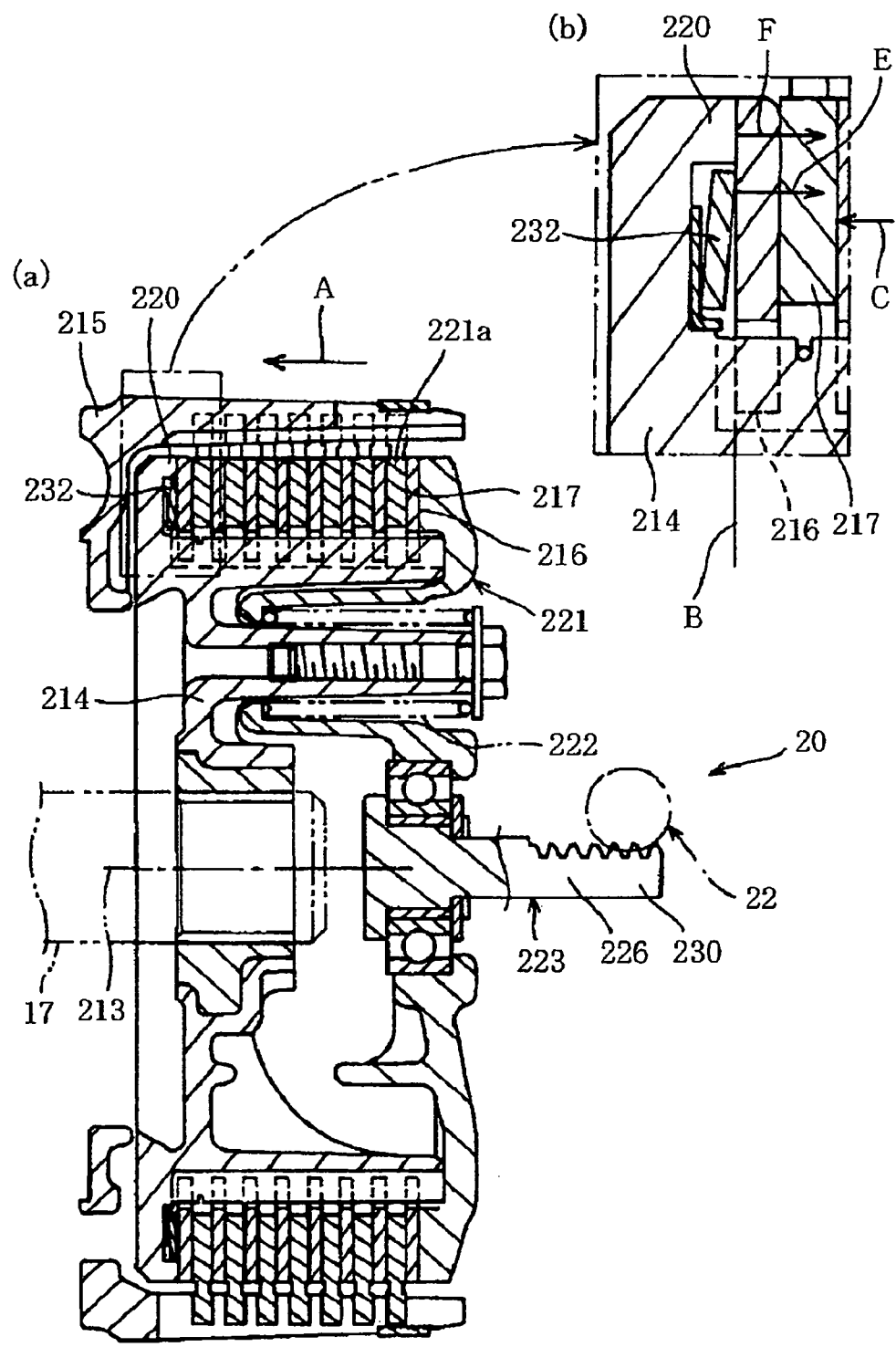

[Fig. 24]
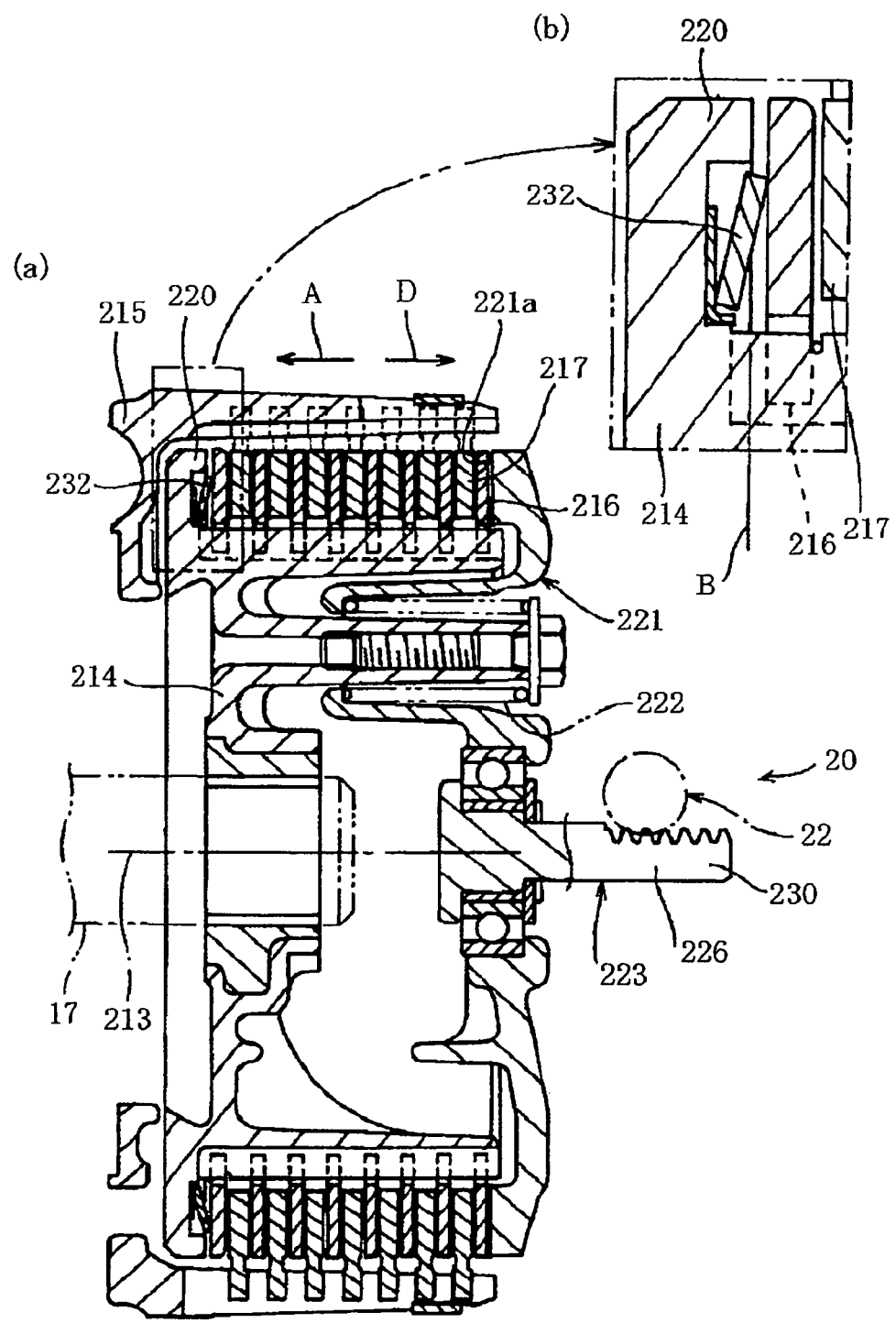

[Fig. 25]
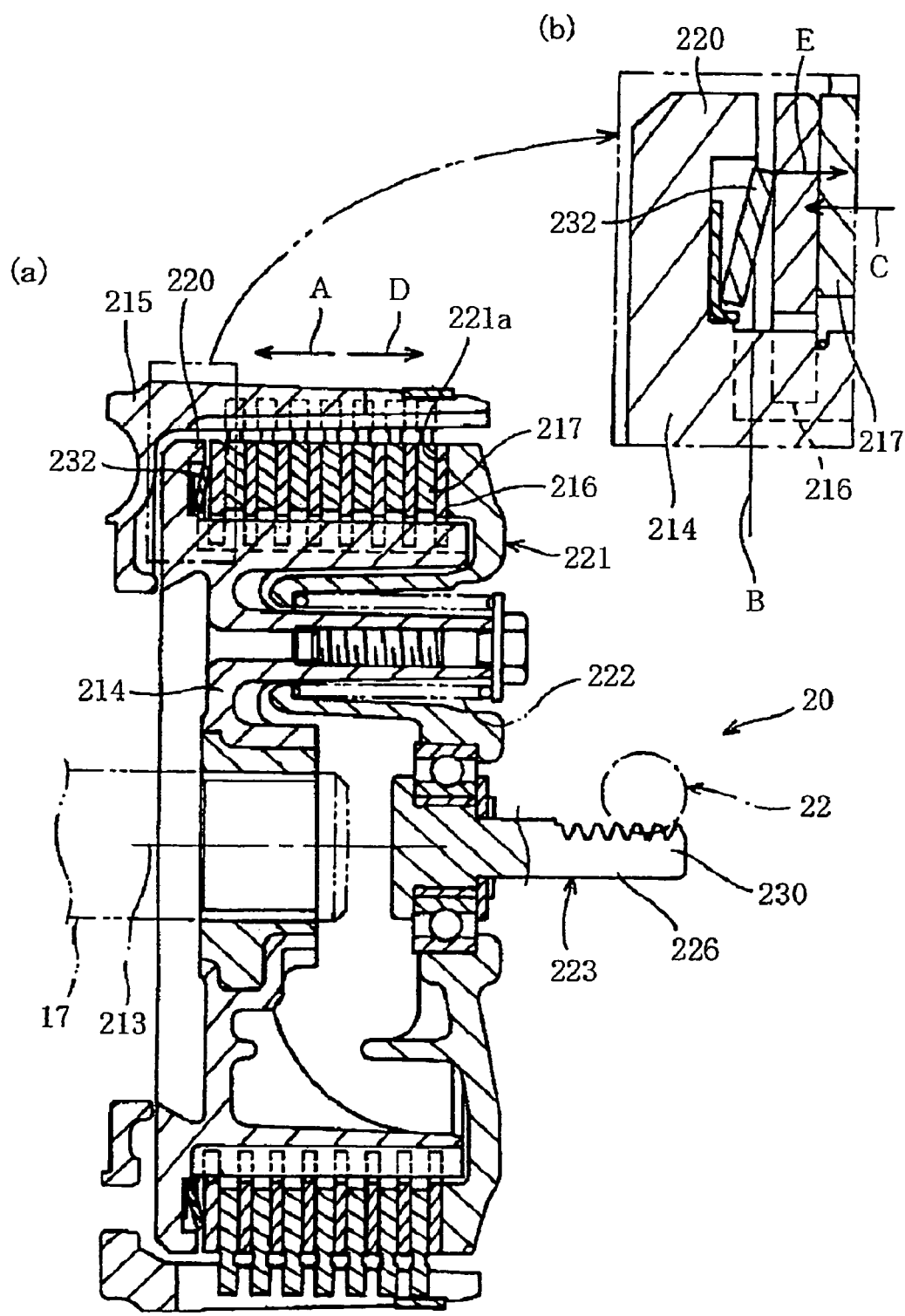

RIDING TYPE VEHICLE

CROSS-REFERENCE TO RELATED APPLICATIONS

This application is a National Phase application of International Application No. PCT/JP2005/012108, filed Jun. 30, 2005, which claimed priority to Japanese Application No. 2004-195630, filed Jul. 1, 2004, each of which is hereby incorporated by reference herein in its entirety.

BACKGROUND OF THE INVENTION

1. Field of the Invention

The present invention relates to a riding type vehicle. More particularly, the present invention relates to a riding type vehicle that includes an automatic transmission that executes a shift change through a clutch actuator and a shift actuator.

2. Description of the Related Art

When a gear speed change is carried out in a motorcycle, generally, the gear speed change is carried out by disengaging a clutch through a clutch lever operated the hand and switching gears by a foot operation to execute the shift change. During such operation, the clutch is successively engaged by operating the clutch lever by the hand. In recent years, there has been proposed a technology for executing an automatic gear speed change operation that does not use a servo motor. However, in comparison with the manual operation, a number of problems are posed by such automatic systems.

For example, when the gear speed change is carried out, a state of the motorcycle (particularly, a state of the clutch) and a timing of the shift change are closely related to each other. As such, the automatic speed change operation is extremely difficult to control. Specifically, when the clutch is expanded by temperature changes (for example, thermal expansion of about 100 μm) or the clutch is worn (for example, wear of about 100 μm), the timing of the clutch can be shifted. This can result in unsmooth shift change operation.

In a manual system, when a person (rider) carries out the gear speed change operation, even when the clutch is exposed to different temperature states (e.g., summer or winter, day or night), or when the clutch is in a new product state or a worn state, the rider instantly determines the states by experience or knowledge and the shift change can be executed smoothly by a flexible and precise operation of the hand and the foot. On the other hand, when the gear speed change operation is executed by a motor or the like, all of the timings of the shift change need to be controlled by an operating apparatus in accordance with the state of the motorcycle, and it can be difficult to firmly and smoothly execute the clutch operation and the shift operation.

Further, in order to simplify the shift operation of the motorcycle, there is disclosed in Japanese patent references JP-A-68-152938 and JP-A-4-266619 a transmission that uses a servo motor that driven based on an output signal of a switch cooperatively moved with ON/OFF operation of a clutch such that a shift change operation is automatically carried out by the servo motor.

However, there remains many challenges associated with a reduction to practice of a motorcycle capable of automatically executing a shift change by using a clutch actuator and a shift actuator.

SUMMARY OF THE INVENTION

An object of the present invention is to provide an automatic transmission for smoothly executing a shift change operation under such situations described above by promoting controllability of a clutch and shortening gear speed change time period by using both a clutch actuator and a shift actuator.

Another object of the present invention is to provide a riding type vehicle (for example, a motorcycle) that includes an automatic transmission that promotes controllability of the clutch and shortens a gear speed change time period.

Accordingly one aspect of the present invention comprises a riding type vehicle that includes an automatic transmission capable of executing a shift change by a clutch actuator and a shift actuator. A clutch, a clutch operation of which is controlled by the clutch actuator, can be a multiplate clutch. The multiplate clutch is provided with a bias member configured to enlarge a partial clutch engagement region of the clutch, and in the shift change, both of the clutch actuator and the shift actuator are controlled to operate overlappingly.

Preferably, the bias member for enlarging the partial clutch engagement region is a coil spring. In one configuration, the bias member enlarges the partial clutch engagement region by reducing a rigidity of the multiplate clutch. In another configuration, the clutch actuator is connected with a control apparatus. The control apparatus is characterized in controlling the clutch from a first state of starting to transmit a drive force on a side of an engine by transmitting an operating force to the clutch by way of an operating force transmitting mechanism to a second state of starting to rotate the clutch in synchronism with the side of the engine by making a stroke by a predetermined amount by the clutch actuator. The bias member is characterized in being provided to the multiplate clutch to construct a constitution in which when a temperature of the clutch is changed, a first range between a stroke position on a low temperature side and a stroke position on a high temperature side in the first state and a second range between a stroke position on a low temperature side and a stroke position on a high temperature side in the second state are separated from each other.

In a one embodiment, the clutch actuator is connected with a control apparatus, the control apparatus controls the clutch from a first state of starting to transmit a drive force on a side of an engine to a second state of starting to rotate the clutch in synchronism with a side of the engine by transmitting an operating force to the clutch by way of an operating force transmitting mechanism by making a stroke by a predetermined amount by the clutch actuator. A bias member provided to the multiplate clutch such that when the clutch is worn, a first range between a stroke position on a side before wearing the clutch and a stroke position on a side after wearing the clutch in the first state and a second range between a stroke position on a side before wearing the clutch and a stroke position on a side after wearing the clutch in the second state are separated from each other.

In one preferred configuration, in the overlapping operation, a shift change operation of the shift actuator is executed in a partial clutch engagement region produced by controlling the clutch actuator. It can also be preferable that a timing of starting the partial clutch engagement region and the shift change operation of the shift actuator are controlled to be synchronized.

In one configuration, the multiplate clutch comprises respective clutch disks arranged on a same axis center, made to be able to be able to rotate relative to each other around the axis center, made to be able to be brought into contact with each other and separated from each other in an axial direction of the axis center and cooperatively connected to a drive side and a driven side. A stopper can be provided for hampering the two clutch disks brought into contact with each other from moving in one direction of the axial direction to a predetermined position or further. A clutch spring can be provided for exerting an urge force to the two clutch disks in the one direction to bring to the two clutch disks movements of which are hampered by the stopper into contact with each other. A bias force release device can be provided for enabling the release of the urge force of the clutch spring exerted to the two clutch disks by inputting an operating force from outside. The clutch actuator can be an actuator for exerting the operating force to the urging force release device. The bias device for enlarging the partial clutch engagement region can be a transmitting torque restricting spring for urging the two clutch disks in other direction of the axial direction to be brought into contact with each other.

In one configuration, the clutch actuator is an actuator for controlling the clutch from a first state of starting to transmit a drive force on a side of an engine to a second state of starting to rotate the clutch in synchronism with the side of the engine by transmitting an operating force to the clutch by way of an operating force transmitting mechanism by making a stroke of a predetermined amount. The clutch actuator and the operating force transmitting mechanism can be characterized in being arranged at outside of the engine. In one arrangement, the actuator is an electric motor. In another arrangement, the clutch actuator is arranged at inside of the engine of the riding type vehicle.

In one arrangement, the operating force transmitting mechanism is provided with a first connecting portion provided on a side of the clutch actuator and a second connecting portion provided on a side of the clutch movably in separating and approaching directions. The mechanism can also be provided with a first bias member for urging the two first and second connecting portions in the separating direction. When the clutch is disconnected, the clutch is configured to be disconnected by making the two first and second connecting portions approach each other against an urge force of the first urging means by driving the clutch actuator.

According to other aspect of the invention, there is provided a riding type vehicle that includes an automatic transmission capable of executing a shift change by a clutch actuator and a shift actuator. The clutch actuator is connected with a control apparatus. The control apparatus is configured to control the clutch from a first state of starting to transmit a drive force on a side of an engine to a second state of starting to rotate the clutch in synchronism with the side of the engine by transmitting an operating force to the clutch by way of an operating force transmitting mechanism by making a stroke by a predetermined amount by the clutch actuator. The vehicle includes a bias member provided with the clutch and configured such that when a temperature of the clutch is changed, a first range between a stroke position on a low temperature side and a stroke position on a high temperature side in the first state and a second range between a stroke position on a low temperature side and a stroke position on a high temperature side in the second state are separated from each other.

According to still other aspect of the invention, there is provided a riding type vehicle that comprises an automatic transmission capable of executing a shift change by a clutch actuator and a shift actuator. The clutch actuator is connected with a control apparatus. The control apparatus is characterized in controlling the clutch from a first state of starting to transmit a drive force on a side of an engine to a second state of starting to rotate the clutch in synchronism with the side of the engine by transmitting an operating force to the clutch by way of an operating force transmitting mechanism by making a stroke by a predetermined amount by the clutch actuator. A bias member is characterized in being provided to the multi-plate clutch such that when the clutch is worn, a first range between a stroke position on a side before wearing the clutch and a stroke position on a side after wearing the clutch in the first state and a second range between a stroke position on a side before wearing the clutch and a stroke position on a side after wearing the clutch in the second state are separated from each other.

In one embodiment, the riding type vehicle is an automatic two wheel vehicle (for example, on-road or off-road type or the like) and the clutch actuator and the shift actuator are characterized in being controlled by an electronic control portion.

In one embodiment, the automatic transmission is characterized in executing the shift change by an instruction of a driver, or an instruction by an electronic control apparatus electrically connected to the clutch actuator the shift actuator.

In another embodiment, the electronic control apparatus is electrically connected with a sensor for detecting a situation of the riding type vehicle, characterized in that the instruction by the electronic control apparatus is carried out in accordance with a situation of the riding type vehicle.

A clutch control apparatus for a riding type vehicle according to an aspect of the present invention is a clutch control apparatus for a riding type vehicle for controlling a clutch from a first state of starting to transmit a drive force on a side of an engine to a second state of starting to rotate the clutch in synchronism with the side of the engine by transmitting an operating force to the clutch by way of an operating force transmitting mechanism by making a stroke by a predetermined amount by a clutch actuator, characterized in that by the operating force transmitting mechanism. When a temperature of the clutch is changed, a first range between a stroke position on a low temperature side and a stroke position on a high temperature side in the first state and a second range between a stroke position on a low temperature side and a stroke position on a high temperature side in the second state are configured to be separated from each other.

A clutch control apparatus for a riding type vehicle according to another aspect of the present invention is a clutch control apparatus for a riding type vehicle for controlling a clutch from a first state of starting to transmit a drive force on a side of an engine to a second state of starting to rotate the clutch in synchronism with the side of the engine by transmitting an operating force to the clutch by way of an operating force transmitting mechanism by making a stroke by a predetermined amount by a clutch actuator. In such an apparatus, the operating force transmitting mechanism, a first range between a stroke position on a side before wearing the clutch and a stroke position on a side after wearing the clutch in the first state and a second range between a stroke position on a side before wearing the clutch and a stroke position on a side after wearing the clutch in the second state are configured to be separated from each other.

In one embodiment, the clutch actuator and the operating force transmitting mechanism are characterized in being arranged at outside of the engine.

In another embodiment, the operating force transmitting mechanism is provided with a first connecting portion provided on a side of the clutch actuator, and a second connecting portion provided on a side of the clutch movably in separating and approaching directions. The mechanism can be provided with first bias member for urging the two first and second connecting portions in the separating directions. When the clutch is disconnected, the clutch is configured to be disconnected by making the first and the second connecting portions approach each other against an urge force of the first urging means by driving the clutch actuator.

In another embodiment, the operating force transmitting mechanism is characterized in that when the clutch is disconnected, the clutch is disconnected by bringing the two first and second connecting portions proximate to each other to be brought into contact with each other against the urge force of the first urging means by driving the clutch actuator.

In another embodiment, the operating force transmitting mechanism is characterized in providing a second bias member for urging the first connecting portion in a direction of approaching the side of the second connecting portion in a state of disconnecting the clutch.

In another embodiment, the first connected portion and the second connecting portion are characterized in being connected slidably in directions of separating from each other.

In another embodiment, the first bias member is a coil spring.

An advantage of certain embodiments and configurations described above is that the speed can automatically be changed by the automatic transmission, which is capable of executing the shift change by the clutch actuator and the shift actuator. The multiplate clutch can be provided with the bias member for enlarging the partial clutch engagement region of the clutch. Further, in the shift change, both of the clutch actuator and the shift actuator can be controlled to operate overlappingly and therefore, to promote a controllability of the clutch and shorten a gear change speed time period. As a result, firm and smooth clutch operation and shift operation can be achieved while including the automatic transmission.

BRIEF DESCRIPTION OF THE DRAWINGS

These and other features, aspects and advantages of the present invention will now be described with reference to the drawings of several preferred embodiments, which embodiments are intended to illustrate and not to limit the invention.

FIG. 1 is a side view of a riding type vehicle (motorcycle) according to an embodiment of the present invention.

FIG. 2 is a block diagram showing a component of the motorcycle of FIG. 1.

FIG. 3 is a block diagram showing a configuration of a control apparatus of the motorcycle of FIG. 1.

FIG. 4 is a graphical illustration of the operation for disconnecting and connecting a clutch in a case of a manual clutch.

FIG. 5 is a graphical illustration of the operation of disconnecting and connecting a clutch by an actuator.

FIG. 6 is a graphical illustration of the operation of disconnecting and connecting a clutch by an actuator when urging means is provided to the clutch to reduce a rigidity thereof.

FIG. 7 is a graphical illustration of a control method in shift up according to an embodiment of the invention.

FIG. 8 is a graphical illustration of a control method in shift down according to an embodiment of the invention.

FIG. 9 is a graphical illustration of a control method in shift down in the embodiment of the invention.

FIG. 10 is a graphical illustration of a control method from starting according to an embodiment of the invention.

FIG. 11 is a side view of an engine mounted to the motorcycle of FIG. 1.

FIG. 12 is a top view of the engine of FIG. 11.

FIG. 13 is a sectional view of a clutch and a periphery thereof.

FIG. 14 is a view of a clutch actuator and a periphery thereof viewed from an axial direction of the clutch actuator.

FIG. 15 is a view showing components of the clutch actuator and a clutch control apparatus.

FIG. 16 is a view showing a state of driving the clutch from a state shown in FIG. 15 in a direction of disengaging a clutch.

FIG. 17 is a view showing a state of driving the clutch in the disengaging direction from the state shown in FIG. 16.

FIG. 18 is a view showing a state of driving the clutch in the disengaging direction from the state shown in FIG. 17.

FIG. 19 is a side view showing a constitution of the clutch actuator according to another embodiment of the present invention.

FIG. 20 is a sectional view showing the clutch actuator of FIG. 19 and a peripheral constitution thereof.

FIG. 21 is a view showing a state of driving the clutch in a disengaging direction from the state shown in FIG. 20.

FIG. 22 is a view showing a state of driving the clutch in the disengaging direction from the state shown in FIG. 21.

FIGS. 23(a) and 23(b) are a side sectional view and a partially enlarged view thereof of the clutch 20 in a connected state according to Embodiment 3 of the invention.

FIGS. 24(a) and 24(b) are a side sectional view and a partially enlarged view thereof of the clutch 20 in a disconnected state according another embodiment of the present invention.

FIGS. 25(a) and 25(b) are a side sectional view and a partially enlarged view thereof of the clutch 20 in a partial clutch engagement state according to the embodiment of FIGS. 24(a) and 24(b).

DETAILED DESCRIPTION OF THE PREFERRED EMBODIMENTS

It was the understanding of the inventors of this application that in order to automatically execute a shift change by using a clutch actuator and a shift actuator in a motorcycle, it cannot substantially be realized to execute a clutch operation and a shift operation as delicately as by a person in conformity with a state of the motorcycle (particularly, a state of a clutch). Accordingly, the inventors conceived enlarging a region of partial clutch engagement by reducing a rigidity of the clutch so as to more easily execute a control by the actuators. However, it is common knowledge that enlargement of the partial clutch engagement region can result prolong the gear speed change time period and therefore, the smooth shift change operation cannot be achieved.

Under such a situation, the inventors of the application have paid attention to operation time periods of a clutch disconnecting and connecting operation by a manual clutch and a clutch disconnecting and connecting operation by an actuator. In the case of the clutch disconnecting and connecting operation by the manual clutch, a clutch lever stroke operation is needed in the clutch disconnecting operation and therefore, even when a skilled rider carries out the operation as fast as possible, a time period to some degree (for example, 0.2 second or more) is taken. On the other hand, in the case of the clutch disconnecting and connecting operation by the actuator, the operation can be finished substantially instantly (for example, 0.1 second or less). Then, even when the partial clutch engagement region is assumedly enlarged, there is a possibility that a total time period of the shift change operation by the shift change by the actuator can be made to be shorter than a total time period by the manual shift change as will be described herein.

Accordingly, an embodiment according to the present invention will now be explained with reference to the drawings. In the following drawings, in order to simplify the explanation, components having substantially the same functions are designated by the same reference notations. Further, it should be appreciated that the present invention is not limited to the following described embodiments or the illustrated embodiments but to the claims which follow this description.

FIG. 1 shows a riding type vehicle 100 according to an embodiment of the present invention. The riding or saddle-type vehicle 100 of the illustrated embodiment includes an automatic transmission capable of executing a shift change by a clutch actuator and a shift actuator. The riding type vehicle 100 shown in FIG. 1 is a motorcycle of an on-road type. In other embodiments, the riding type vehicle 100 of the embodiment may be a motorcycle of an off-road type.

The motorcycle 100 of the example shown in FIG. 1 includes a front wheel 11 and a rear wheel 12. A fuel tank 14 is provided rearward from a handle 13 for steering the front wheel 11. A seat 15 is arranged rearward from the fuel tank 14, and a rider 110 rides on the seat 15. An engine 16 is provided on lower sides of the fuel tank 14 and the seat 15, and the engine 16 is supported by a vehicle body frame.

With continued reference to FIG. 1, a front fork 19 is steerably supported by a front end portion of the motorcycle 100, and the rear wheel 11 supported by a lower end portion of the front fork 19. The handle 13 is supported at an upper end portion of the front fork 19. Further, the rear wheel 12 for driving is supported at a rear end portion of the motorcycle 100. The vehicle body is supported on a running road face by the front wheel 11 and the rear wheel 12.

In FIG. 2, illustrates various components of the motorcycle 100 through a block diagram.

As shown, the motorcycle 100 of the embodiment is provided with a clutch actuator 22 and a shift actuator 32. Operation of a clutch 20 can be controlled by a clutch actuator 22. The clutch 20 according to the embodiment is a multiplate clutch. As will be explained in detail below, the multiplate clutch is provided with bias member 97 that can provide means for enlarging a partial clutch engagement region of the clutch and reducing a rigidity of the clutch 20, which enlarges the partial clutch engagement region of the clutch 20. The bias member can be for generating an urging or biasing force and can be a spring (e.g., coil spring, belleville spring or the like) or an elastic member of rubber or the like.

The clutch actuator 22 and the shift actuator 32 are electrically connected to an electronic control portion 50. The electronic control portion 50 is also electrically connected with an operating portion 52 attached to a portion of the handle 13. The operating portion 52 includes an UP switch 52a for executing shift up and a DOWN switch 52b for executing shift down. According to the illustrated embodiment, in a shift change, both of the clutch actuator 22 and the shift actuator 32 are controlled by the electronic control portion 50 to be operated overlappingly. A method of controlling the overlapping operation will be described later.

The engine (internal combustion engine) 16 of the motorcycle 100 is cooperatively connected with the multiplate clutch 20 by way of a power transmitting shaft 17. The multiplate clutch 20 is cooperatively connected with a transmission 30. The transmission 10 is attached with power transmitter 18 that can be for transmitting power and can be of a chain wrapping type or the like for cooperatively connecting the rear wheel 4.

The transmission 30 comprises a housing 34 that includes an outer shell thereof, an input side member 35 and an output side member 36 provided at inside of the housing 34, and a speed change clutch 37 for operating to connect and disconnect the output side member 36 to and from the input side member 35. The input side member 35 is connected to the multiplate clutch 20 and the output side member 36 is connected to the power transmitter 18. The speed change clutch 37 is connected with the actuator 32 of a hydraulic type for operating the speed change clutch 37 and the transmission 30 is made to be able to be shifted to a desired speed change state by operation of disconnecting and connecting the speed change clutch 37 by the actuator 32.

The handle 13 is provided with the operating portion 52 operated when the transmission 30 is made to execute a speed change operation as described above. Further, there is provided a electronic apparatus control (electronic controlling device) 50 for bringing about a desired speed change state by making the transmission 30 execute an automatic speed change operation by operating the operating portion 52, and respective actuators 22, 32 and the operating portion 52 are respectively connected electrically to the control apparatus 50.

FIG. 3 shows a constitution of the control apparatus (ECU; electronic control unit, or engine control unit) 50 according to the illustrated embodiment.

The control apparatus 50 of the illustrated embodiment is configured to control the engine 16. The control apparatus (ECU) 50 is electrically connected with the UP switch 52a for executing shift up, and the DOWN switch 52b for executing shift down along with the clutch actuator 22, the shift actuator 32 described above. In addition thereto, the control apparatus 50 is electrically connected with an engine rotational number sensor 111, a vehicle speed sensor 112, a clutch actuator position sensor (potentiometer sensor) 113, a shift actuator position sensor 114, a gear position sensor 115, and detected values and operating signals therefrom are inputted to the control apparatus 50.

Further, the control apparatus 50 is connected also to a gear position display portion 119, an engine ignition portion 120, a fuel injection apparatus 121 along with the clutch actuator 22 and the shift actuator 32 and is constituted to control to drive these by signals from the respective sensors 111. Here, signals from the UP switch 116 and the DOWN switch 117, signals from the clutch actuator position sensor 113, the shift actuator position sensor 114 and the like are inputted to the control apparatus 50, and the clutch actuator 22 and the shift actuator 32 are controlled to be driven by a control signal from the control apparatus 50.

Next, a partial clutch engagement region (or, partial clutch engagement range) in a clutch operation will be explained in reference to FIG. 4 through FIG. 6.

Although theoretically when a rigidity of a clutch drive system is infinite, the partial clutch engagement region is not present, in actual situations, a partial clutch engagement region is present. Causes of bringing about the partial clutch engagement include elastic deformation (strain, torsion, elongation) of the clutch drive system, for example, strain of a clutch friction plate, strain of a pressure plate, contraction of a push rod, torsion of a push lever, elongation of a clutch wire or a hose and the like can be pointed out.

FIG. 4 is a graph showing a disconnecting and connecting operation of a clutch in a case of a manual clutch, the ordinate designates a lever load, the abscissa designates a length of a clutch lever stroke. As shown by FIG. 4, in the case of manual clutch operation, the clutch is disconnected and connected as follows.

First, even when the clutch lever stroke is increased (notation a), since there is a play section at first, the lever load remains unchanged at the section (notation s). Successively, the clutch is brought into a partial clutch engagement range, with an increase in the lever load (arrow mark b), a clutch transmitting torque is reduced (notation t), and the clutch is disconnected by terminating the partial clutch engagement range (arrow mark c).

Thereafter, while the clutch transmitting torque stays to be null (notation u), a clutch disconnecting operation is carried out (arrow mark d). Next, when the clutch is connected, the lever load is reduced by a friction of the drive system (arrow mark e), successively, a clutch connecting operation is carried out (notation f), and the clutch is connected (notation g). Thereafter, when the clutch is brought into the partial clutch engagement range (arrow mark h), the clutch transmitting torque is increased (notation t), and the clutch is connected finally (notation a).

In this way, in the case of the manual clutch, based on the operation of the rider, the clutch disconnecting operation and connecting operation are executed by including the play section and the partial clutch engagement range.

On the other hand, FIG. 5 shows a disconnecting and connecting operation of a clutch by an actuator. The ordinate in FIG. 5 designates a clutch transmitting torque and the abscissa designates an actuator stroke.

Here, the partial clutch engagement range refers to a range between clutch in to stall. Clutch in refers to that the pressure plate is brought into contact with the friction plate and a drive force is started to be transmitted, on the other hand, stall refers to that the clutch transmitting torque exceeds an engine generated torque and the clutch is synchronizingly started to rotate. Further, full stall refers to that the clutch transmitting torque exceeds a maximum engine generated torque and the clutch is synchronizingly started to rotate. Further, during a time period of the partial clutch engagement, although a load applied on the pressure plate is changed, the pressure plate is not moved.

As shown by FIG. 5, in accordance with a stroke of the actuator, there is brought about a change in connection of the clutch, partial clutch engagement range, disconnection of the clutch, and the clutch transmitting torque is changed between clutch in and full stall.

Here, under a state in which the clutch is not worn at normal temperature, in a relationship between the stroke of the clutch actuator and the clutch transmitting torque, the partial clutch engagement range is set to constitute a characteristic line A.

However, even when an inclination of the partial clutch engagement range is set as shown by the characteristic line A (bold line) in a state in which the clutch is not worn at normal temperature, when the clutch is thermally expanded by 100 μm by a temperature rise, the characteristic line is changed as shown by a characteristic line B (two-dotted chain line), as a result, the partial clutch engagement range is shifted from the setting. Further, when the clutch is worn by, for example, 100 μm, the characteristic line is changed as shown by a characteristic line C (one-dotted chain line) and also in this case, the partial clutch engagement range is shifted from the setting.

That is, when the clutch is thermally expanded, a clutch in position A1 indicated by the bold line A becomes a full stall position B2 indicated by the two-dotted chain line B. Or, when the clutch is worn, a full stall position A2 indicated by the bold line A becomes a clutch in position C1 indicated by the one-dotted chain line C. Then, there can be brought about a case in which how accurately the clutch is operated based on a previously set operating stroke of the actuator, the firm clutch operation cannot be carried out.

Although naturally, it may not be impossible to control the stroke of the actuator 22 by the control apparatus 50 by also including thermal expansion, wear or other factor, the control is not realistic. In order to break through the problem, the inventors of the application have designed the clutch such that an amount of a change in the clutch transmitting torque relative to operation of the actuator becomes rather insensitive.

In order to make the amount of a change in the clutch transmitting torque insensitive, a rigidity of the clutch 20 may be reduced. According to the embodiment, the rigidity is reduced by providing a bias member to provide an urging force to the clutch 20. In that case, the characteristic of the operation of disconnecting and connecting the clutch by the actuator is changed from FIG. 5 to FIG. 6. Also in FIG. 6, similar to FIG. 5, the ordinate designates the clutch transmitting torque and the abscissa designates the actuator stroke.

In this case, as shown by FIG. 6, in a state in which the clutch is not worn at normal temperature (for example, 25.degree. C.), the relationship between the stroke of the clutch actuator 22 and the clutch transmitting torque is set such that the partial clutch engagement range becomes a characteristic line A. An inclination of the characteristic line A in FIG. 6 is made to be more gradual than that of the characteristic line A in FIG. 5. Here, in FIG. 6, when the clutch is expanded, the characteristic line A is changed into a characteristic line B indicated by a two-dotted chain line, on the other hand, when the clutch is worn, the characteristic line A is changed into a characteristic line C indicated by a one-dotted chain line.

In order to set the partial clutch engagement range shown in FIG. 6, that is, when the partial clutch 20 engagement range is set by providing a bias member (for example, a spring for enlarging the partial clutch engagement region), the following setting may be executed.

First, under a setting condition shown in FIG. 6, when the clutch 20 is changed in temperature and the characteristic line A is changed to the characteristic line B, a first range H1 between a stroke position A1 of a low temperature side (characteristic line A) and a stroke position B1 of a high temperature side (characteristic line B) in a clutch in state, and a second range H2 between a stroke position A2 on the low temperature side (characteristic line A) and the stroke position B2 on the high temperature side (characteristic line B) in a full stall state are constituted to be separated from each other. In this case, the first range H1 and the second range H2 are set to be separated from each other by a distance L1.

Further, when the clutch 20 is worn and the characteristic line A is changed to the characteristic line C, a third range H3 between the stroke position A1 on a side before wearing the clutch (characteristic line A) and a stroke position C1 on a side after wearing the clutch (characteristic line C) in the clutch in state, and a fourth range H4 between the stroke position A2 on a side before wearing the clutch (characteristic line A) and a stroke position C2 on a side after wearing the clutch (characteristic line C) in the full stroke state are constituted to be separated from each other. Here, the third range H3 and the fourth range H4 are set to be separated from each other by a distance L2.

According to the configuration of the illustrated embodiment, as shown by FIG. 6, the inclination of the characteristic line A in the partial clutch engagement range is made to be gradual to a predetermined angle by using the bias member (for example, coil spring or the like) for enlarging the partial clutch engagement region. Therefore, even when the clutch is thermally expanded and the characteristic line A is changed to the characteristic line B as described above, since the first range H1 and the second range H2 are separated from each other, only the stroke position of the clutch in state or the full stall state is more or less shifted and different from the clutch shown in FIG. 5, it can be restrained that the operation of the clutch 20 is hampered.

Incidentally, according to the clutch having the characteristic shown in FIG. 5, when the stroke position of the clutch in state is set, by thermally expanding the clutch, actually, the stroke position is brought into the full stall state and therefore, different from the clutch operation by a person, when the clutch is going to be operated by the actuator, there is a concern of hampering the operation.

In addition thereto, even when a clutch disk of the clutch 20 is worn and the characteristic line A is changed into the characteristic line C, since the third range H3 and the fourth range H4 are separated from each other, similar to the above-described, only the stroke position in the clutch in state or the full stall state is more or less shifted, different from the clutch shown in FIG. 5, it can be restrained that the operation of the clutch 20 is hampered.

Although in this way, by widening the partial clutch engagement region by adding the bias member, the controllability of the clutch 20 is promoted, thereby, even when the clutch actuator 22 is used, the normal operation of the clutch 20 can be ensured, widening the partial clutch engagement region amounts to prolonging a gear speed change time period. Smooth clutch operation and shift operation are hampered thereby.

Hence, the inventors of the application have conceived to shorten the gear speed change time period by controlling to overlappingly operate both of the clutch actuator 22 and the shift actuator 32 to thereby execute the control.

An explanation will be given of the control of operating the clutch actuator 22 and the shift actuator 32 overlappingly (or synchronizingly) in reference to FIG. 7 through FIG. 12.

FIG. 7 illustrates diagrams for explaining a control method in shift up. Graph (a) shows a control of a clutch motor as the clutch actuator 22 by a potentiometer, and regions of clutch on (ON), partial clutch engagement (partial clutch engagement), clutch off (OFF) are present. Graph (b) shows a control of a shift motor as the shift actuator 32 by a potentiometer. Graph (c) shows an ignition timing and Graph (d) shows a gear position by a potentiometer as reference. Graph (e) is a graph corresponding a time axis and respective operations.

As shown by Graph (e), when shift up is executed from a running mode, the operation returns to running mode by way of clutch on operation, partial clutch engagement operation, clutch off operation. Here, shift up is not executed by operating the shift actuator (shift motor) after the clutch is made OFF by the clutch actuator (clutch motor), but shift up operation by the shift actuator has already been executed by the shift actuator when the clutch is brought into the partial engagement region (partial clutch OFF state) by the clutch actuator.

Such an overlapping operation (synchronizing operation) needs to be controlled by several tens milliseconds (for example, about 30 milliseconds) and cannot be realized by a clutch operation of a person (manual clutch operation). Further, according to the example, the clutch is controlled not to be disengaged up to a strict complete OFF position and the clutch operating time period is shortened even thereby.

By the overlapping operation (synchronizing operation) of the clutch actuator 22 and the shift actuator 32, even when the partial clutch engagement region of the clutch is enlarged by the bias member, the gear change time period can be shortened, in reality, the gear speed change time period shorter than that of the manual clutch operation is achieved. As described above, the controllability of the clutch is promoted by the bias member the provides enlargement of the partial clutch engagement region and therefore, according to the configuration of the illustrated embodiment, the automatic transmission realizing to promote the controllability of the clutch and shorten the gear change speed time period can be constructed.

FIG. 8 illustrates diagrams for explaining a control method in shift down. In FIG. 8, the ignition timing (Graph (c) of FIG. 7) is not shown. Also in shift downs the overlapping operation of the clutch actuator 22 and the shift actuator 32 is carried out and the shift down operation is executed during the partial clutch OFF state. Further, also in the example shown in FIG. 8, the clutch operating time period is shortened by controlling the clutch not to be disengaged up to the strict complete OFF position.

Next, an example of a control method in shift down shown in FIG. 8 will be described in detail. Control (clutch OFF operation) of the clutch actuator (clutch motor) is started within t1 from a shift change start determination t0. Although according to the embodiment, t1 is set to 0 millisecond, t1 may be set in accordance with an operation feeling, for example, may be set in a time period of 0 through 30 milliseconds. On the other hand, a control (shift down) of the shift actuator (shift motor) is started within a predetermined time period (t2) from the shift change start determination t0. It is preferable to set the time period t2 to synchronize with a point of being brought into the partial clutch engagement region by operation of the clutch actuator. Although according to the embodiment, the synchronizing time period t2 is set to 30 milliseconds, t2 can be set to, for example, 10 milliseconds through 60 milliseconds.

When the potentiometer of the clutch motor indicates V1 (for example, 2.35 V), the state is shifted from clutch OFF to partial clutch engagement state and end of shift up is determined at a clutch rotational number difference of 120 rpm and by a clutch position equal to or smaller a predetermined valued, in other words, a value of the potentiometer of the clutch motor of V2 (for example, 1.65 V), or less. The value of the potentiometer V3 of the shift motor at this occasion is, for example, 1.00 V. Thereafter, the clutch ON operation is started, and the value of the potentiometer of the clutch motor is set to V4 (for example, 0.69 V), and the value of the potentiometer of the shift motor is set to V5 (for example, 2.50 V).

In addition thereto, as a reference of other example, FIG. 10 shows a control from starting, particularly, combined with starting and speed change when a shift change (shift up) is executed in starting. Graphs (a) through (d) shown in FIG. 10 are the same as Graphs (a) through (d) of FIG. 7.

According to the motorcycle 100 of the illustrated embodiment of the invention, the speed can automatically be changed by the automatic transmission capable of executing shift change by the clutch actuator and the shift actuator, bias member for enlarging the partial clutch engagement region of the clutch is provided at the multiplate clutch, further, in shift change, both of the clutch actuator and the shift actuator can be controlled to operate overlappingly and therefore, promotion of the controllability of the clutch and shortening of the gear speed change time period can be realized. As a result, firm and smooth clutch operation and shift operation can be achieved while providing the automatic transmission.

Next, the riding type vehicle (motorcycle) of the illustrate embodiment will be explained further in details in reference to FIG. 11 through FIG. 15.

FIG. 11 is a side view of the engine 16 mounted to the motorcycle of the embodiment. The clutch actuator 22 and the shift actuator 32 are arranged at a surrounding of the engine 16.

FIG. 12 is a top view of the engine 16 shown in FIG. 11. Although notations of members other than the clutch actuator 22 and the shift actuator 32 are indicated, the notations will be described along with an explanation of the other members.

FIG. 13 is a sectional view of the clutch 20 and a periphery thereof, FIG. 14 is a view of the clutch actuator 22 and a periphery thereof viewed from an axial direction of the clutch actuator 22. FIG. 15 is a view showing components of the constructions of the clutch actuator 22 and a clutch control apparatus (operating force transmitter mechanism) 53.

The engine 16 of the illustrated embodiment shown in FIG. 11 and FIG. 12 is arranged with the clutch 20 on the drive side and is provided with the clutch control apparatus 53 for connecting and disconnecting the clutch 20.

As shown by FIG. 13, the clutch 20 includes a clutch housing 57 connected to a crankshaft 56 of the engine 16 and rotated in accordance with rotation of the crankshaft 56, and a clutch boss 58 rotatably arranged on an inner side of the clutch housing 57. The clutch boss 58 is connected to a main shaft 59.

The clutch housing 57 is arranged with a plurality of first clutch disks 60 in a shape of a circular ring slidable only in an axial direction, further, the clutch boss 58 is arranged with a plurality of second clutch disks 61 in a shape of a circular ring slidable only in the axial direction. The pluralities of first clutch disks 60 and second clutch disks 61 are configured to be arranged alternately to each other to overlap in the axial direction.

Further, a pressure plate 62 for pressing the first clutch disk 60 and the second clutch disk 61 in a direction of bringing the first clutch disk 60 and the second clutch disk 61 into press contact with each other is arranged movably in parallel with the axial direction, and the pressure plate 62 is urged by a clutch spring 63 in the direction of bringing the disks into press contact with each other.

By moving the pressure plate 62 in a left direction of FIG. 13 (arrow mark A direction) against an urge force of the clutch spring 63, the state of bringing the first clutch disk 60 and the second clutch disk 61 into press contact with each other is released, and the clutch 20 is constituted to be disengaged by respectively moving the disks relative to each other.

The clutch 20 is disengaged by moving a clutch disengaging rod 66 of the clutch control apparatus 53 inserted into the main shaft 59 in a left direction of FIG. 13 (arrow mark A direction).

The clutch control apparatus 53 is configured to control the clutch 20 from a first state of starting to transmit a drive force on a side of the engine 16 (hereinafter, referred to as "clutch in state") to a second state of starting to rotate the clutch 20 in synchronism with the side of the engine 16 (hereinafter, referred to as "full stall state") by transmitting the operating force to the clutch 20 by way of an operating force transmitting mechanism 69 by making the clutch actuator 22 make a stroke by a predetermined amount.

Based on the operation of the operating force transmitting mechanism 69, a relationship between the stroke and the clutch transmitting torque of the clutch actuator 22 in a state in which the clutch is not worn at normal temperature is as shown by FIG. 6 mentioned above. That is, the partial clutch engagement range is set to be the characteristic line A by an a bias member (spring coil 97 in FIG. 15) and the inclination of the characteristic line A is set to be more gradual than that shown in FIG. 5.

Specific configurations of the clutch actuator 22 and the operating force transmitting mechanism 69 of the illustrated embodiment are described below.

In the illustrated embodiment, the clutch actuator 22 and the operating force transmitting mechanism 69 are arranged at outside of the engine 16, here, as shown by FIG. 11 and FIG. 12, on a rear side of a cylinder and an upper side of a crank case. Further, as shown by FIG. 12, the clutch actuator 22 is arranged along a vehicle width direction.

Further, as shown by FIG. 15 and the like, according to the clutch actuator 22, a worm gear 68a is provided at a front end portion of a drive shaft to be driven to rotate, and a gear 74 in a fan-like shape of the operating force transmitting mechanism 69 is brought in mesh with the worm gear 68a. The gear 74 is provided pivotably centering on a shaft 75 and a lever member 76 substantially in a V-like shape is arranged to pivot integrally with the gear 74.

According to the lever member 76, one end portion 76a thereof is pivotably connected with a first connecting portion 79 on a side of the clutch actuator 22 by way of a shaft 77, and other end portion 76b is hung with one end portion 80a of a tension spring 80 as "second urging means". Other end portion 80b of the tension spring 80 is caught by a locking portion 68b as shown by FIG. 15. By the tension spring 80, the lever 76 is urged to pivot in the counterclockwise direction in FIG. 15 (clutch disengaging direction). Both sides of the lever 76 can be provided with stoppers 78 to stop pivoting the lever member 76 at predetermined positions.

Further, a second connecting portion 82 is arranged to be opposed to the first connecting portion 79 coaxially therewith. The first connecting portion 79 is screwed with a male screw portion 85a of a screw member 85 at a screw hole 84a of a first connecting main body 84 and the male screw portion 85a is screwed with a nut 86. Further, a front end portion 85b of the screw member 85 is pivotably connected with one end portion 76a of the lever member 76 by way of the shaft 77.

Further, similar to the first connecting portion 79, the second connecting portion 82 is screwed with a male screw portion 90a of a screw member 90 at a screw hole 89a of a second connecting portion main body 89, and a nut 91 is screwed to the male screw portion 90a. Further, a front end portion 90b of the screw member 90 is pivotably connected with one end portion 93a of a drive lever 93 by way of a shaft 94.

Further, a connecting pin 96 can be inserted into through holes 84b, 89b of the two connecting portion main bodies 84, 89 and the two connecting portion main bodies 84, 89 can be provided movably in separating and approaching directions and the coil spring 97 which urges the two connecting portion main bodies 84, 89 in the separating direction is arranged between the two connecting portion main bodies 84, 89.

Further, the drive lever 93 is provided pivotably centering on a drive shaft 93b provided at other end portion thereof, a plane portion 93c is formed at the drive shaft 93b, and one end portion 66a of the clutch disengaging rod 66 is brought into contact with the plane portion 93c. Thereby, when the drive shaft 93b is pivoted by pivoting the drive lever 93, the clutch 20 is constituted to be disengaged by pressing the clutch disconnecting rod 66 to the plane portion 93c of the drive shaft 93b.

Next, the operation will be explained also in reference to FIG. 16 through FIG. 18.

In order to disengage the clutch 20 from the full stall state of connecting the clutch 20, the clutch actuator 22 is operated by operating the UP switch 52a and the DOWN switch 52b provided at the handle 13 to rotate the worm gear 68a shown in FIG. 15.

Then, the gear 74 and the lever member 76 are pivoted by a predetermined amount in the counterclockwise direction centering on the shaft 77, and the first connecting portion 79 approaches the side of the second connecting portion 82 while pushing to contract the coil spring 97.

Thereby, by an urge force of the coil spring 97, the side of the second connecting portion 82 is pushed, the drive lever 93 is pivoted centering on the drive shaft 93b, and the clutch disengaging rod 66 is moved in a right direction of FIG. 6 by the plane portion 93c of the drive shaft 93b.

By the movement, the pressure plate 62 is moved in a left direction of FIG. 13 (arrow mark A direction) against the urge force of the clutch spring 63 and a force of bringing the respective first, second clutch disks 60, 61 into contact with each other is going to be reduced. Thereby, the partial clutch engagement state is brought about.

When the clutch actuator 22 is further driven, as shown by FIG. 16, the first connecting portion 79 is brought into contact with the second connecting portion 82, and when the clutch actuator 22 is further driven from the state, as shown by FIG. 17 and FIG. 18, the drive lever 93 is pivoted and the clutch 20 is disengaged.

At this occasion, the inclination of the characteristic line A in the partial clutch engagement range is made to be gradual up to a predetermined angle as shown by FIG. 6 by using the coil spring 97 or the like and therefore, even when the characteristic line A is changed as in the characteristic line B by thermally expanding the clutch, by making the first range H1 and the second range H2 separate from each other, only the stroke portion in the clutch in state or the full stall state is more or less shifted and operation of the clutch 20 is not hampered.

Further, even when the first, second clutch disks 60, 61 of the clutch 20 are worn and the characteristic line A is changed as in the characteristic line C, since the third range H3 and the fourth range H4 are separated from each other, similar to the above-described, only the stroke position in the clutch in state or the full stall state is more or less shifted, as a result, the operation of the clutch 20 is not hampered.

Further, according to illustrated embodiment, the clutch actuator 22 and the operating force transmitting mechanism 69 are arranged at outside of the engine 16. Therefore, adjustment, maintenance or the like of the clutch actuator 22 and the operating force transmitting mechanism 69 can easily be carried out. Particularly, since the multiple plate clutch 20 is overlapped with a number of plates (first, second clutch disks 60, 61), an integration error is amplified and therefore, it is extremely effective that the adjustment can easily be carried out.

Further, although according to the illustrated embodiment, the clutch actuator 22 can be arranged at outside of the engine 16, the clutch actuator 22 may be arranged to be integrated to inside of the engine 16 in view of achieving space saving formation. Different from a vehicle of a passenger four wheel vehicle or the like, a space for arranging the clutch actuator 22 can be extremely small in the motorcycle and therefore, an advantage of capable of achieving space saving formation is considerable.

Further, the operating force transmitter mechanism 69 can provide the first connecting portion 79 provided on the side of the clutch actuator 22 and the second connecting portion 82 provided on the side of the clutch 20 movably in the separating and approaching directions and providing the coil spring 97 for urging the two first, second connecting portions 79, 82 in the separating direction and therefore, a comparatively simple constitution can be constructed and a constitution which is mechanical and is operated less erroneously can be constructed.

Further, the clutch 20 can be firmly disconnected since the clutch 20 can be configured to be disconnected by making the first, the second connecting portions 79, 82 proximate to each other to be brought into contact with each other. Further, by urging the first connecting portion 79 in the clutch disengaging direction by using the tension spring 80, the drive force of the clutch actuator 22 can be assisted, and the clutch actuator 22 can be decreased.

Further, by using the coil spring 97 as the "first urging means", the coil spring 97 can easily be arranged between the first connecting portion 79 and the second connecting portion 82 and also an outer shape of the operating force transmitting mechanism 69 can be made to be contact.

Next, another embodiment of the invention will be explained in reference to FIG. 19 through FIG. 22.

FIG. 19 is a side view showing a configuration of the clutch actuator 22 according the illustrated embodiment, FIG. 20 is a sectional view showing the clutch actuator 22 and a peripheral configuration thereof. FIG. 21 shows a state of driving the clutch in a disengaging direction from a state shown in FIG. 20, FIG. 22 shows a state of further driving the clutch in the disengaging direction from the state shown in FIG. 21.

The illustrated embodiment is a modified example of the embodiment described above with reference to FIGS. 1-18, and differs from the previous embodiment in the configuration of the gear 74 and the lever member 76 of the operating force transmitter mechanism 69 and a constitution of the drive lever 93.

In place of the gear 74 and the lever member 76 according to the first embodiment, according to second embodiment, a pinion gear 101 is provided, and is brought in mesh with the worm gear 68a of the clutch actuator 22 similar to that of the first embodiment.

The pinion gear 101 can be provided with the shaft 77 at a position eccentric to a center of rotation, and the front end portion 85b of the screw member 85 of the first connecting portion 79 can be pivotably connected to the shaft 77. Further, in the pinion gear 101, a locking pin 102 can be provided to be projected at a position contiguous to the shaft 77, and the one end portion 80a of the tension spring 80 similar to that of the first embodiment is caught by the locking pin 102.

Thereby, as shown by FIG. 20 through FIG. 22, the first connecting portion 79 can be configured to displace similar to that of the first embodiment by rotating the shaft 77 centering on the center of rotation when the pinion gear 101 is rotated. Further, by the tension spring 80, the pinion gear 101 can be urged in a direction of disconnecting the clutch 20.

Further, in place of the drive lever 93 substantially in a linear shape of the first embodiment, according to present embodiment, a drive lever 103 of substantially L-like shape is provided. The drive lever can be is connected with the second connecting portion 82 similar to that of the first embodiment at one end portion 103a thereof by way of the shaft 94, provided with a drive shaft 103b at a portion thereof folded to bend in the L-like shape and is configured to pivot centering on the drive shaft 103b. The drive shaft 103b is formed with a plane portion 103c similar to that of the first embodiment, and is configured such that the clutch disengaging rod 66 is pressed by the plane portion 103c.

Further, other end portion 103d of the drive lever 103 is connected with a wire 104 extended from a clutch lever 105 provided at the handle 13 shown in FIG. 1, and the clutch 20 is constituted to be disengaged manually by pivoting the drive lever 103 by pulling the wire 104.

According thereto, by driving the clutch actuator 22, the pinion gear 101 can be pivoted by way of the worm gear 68a, and the first connecting portion 79 can be displaced. Thereby, similar to the first embodiment, by pivoting the drive lever 103 by pressing the second connecting portion 82, the clutch disengaging rod 66 is pushed to slide by way of the drive shaft 103b to disengage the clutch 20.

Further, according to the second embodiment, not only the clutch 20 can be disengaged by the clutch actuator 22 as described above, but also the clutch 20 can manually be disengaged by operating the clutch lever 105. That is, since the first connecting portion 79 and the second connecting portion 82 of the operating force transmitter mechanism 69 are arranged to be separate from each other and approach each other, even when the clutch actuator 22 is not operated and the position of the first connecting portion 79 is not displaced, the second connecting portion 82 can be displaced. Therefore, by pulling the wire 104 by grabbing the clutch lever 105, the drive lever 103 connected with the second connecting portion 82 by way of the wire 104 can be pivoted regardless of driving the clutch actuator 22.

Therefore, the clutch 20 is disengaged by pivoting the drive shaft 103b by pivoting the drive lever 103 and therefore, also manual operation can be used and a way of use can be improved.

With regard to other configurations and operations of the second embodiment, those of portions similar to those of the first embodiment will be omitted for simplifying the explanation. Further, although in the above-described embodiments, the multiplate type friction clutch has been used as a clutch, the invention is not limited thereto but the clutch may be of a dry type, a wet type so far as the clutch is a clutch a transmitting state of which is changed by a load.

Further, the clutch actuator 22 of an electric type or a hydraulic type can be used. Further, the sensor for detecting a position of operating the clutch actuator 22, the sensor is not limited to the above-described potentiometer sensor but a rotary encoder may be used for detecting a rotational position, or a stroke sensor may be used for detecting a linear position. In addition thereto, with respect to the bias member, in place of the coil spring 97, other spring, an elastic member of rubber, resin or the like can also be used to provide a urging or biasing force.

Next, a third illustrated embodiment of the invention will be explained in reference to FIG. 23 through FIG. 25. Also in the description of the third embodiment, a description will be given of a method capable of enlarging a partial clutch engagement region by providing a bias member at the clutch for enlarging the partial clutch engagement region.

FIG. 23(a) is side sectional view of the clutch 20 in the connected state according to the third illustrated embodiment, FIG. 23(b) is a partially enlarged view thereof. FIG. 24(a) is a side sectional view of the clutch 20 in the disconnected state according to the third illustrated embodiment, FIG. 24(b) is a partially enlarged view thereof. FIG. 25(a) is a side sectional view of the clutch 20 in the partial clutch engagement state according to the third illustrated embodiment, and FIG. 25(b) is a partially enlarged view thereof.

As shown by FIG. 23, the clutch 20 can include an inner support member 214 supported by the power transmitting shaft 17 to be able to rotate along with the power transmitting shaft 17 around an axis center 213 of the power transmitter shaft 17 (refer also to FIG. 2), and an outer support member 215 disposed on the axis center 213, outwardly fitted to the inner support member 214 and supported by the power transmitting shaft 17 to be able to rotate around the axis center 213. Whereas the inner support member 214 is cooperatively connected to the power transmitter shaft 17, the transmission 30 (refer to FIG. 2) is cooperatively connected to the outer support member 215.

Further, the clutch 20 can include a plurality of first clutch disks 216 in a shape of a circular ring disposed on the axis center 213, outwardly fitted to be engaged with the inner support member 214 slidably only in an axial direction, and a plurality of second clutch disks 217 in a shape of circular ring disposed on the axis center 213 and inwardly fitted to be engaged with the outer support member 215 slidably only in the axial direction. Further, the first clutch disks 216 and the second clutch disks 217 can be arranged alternately in the axial direction of the axis center 213 and opposed to each other in the axial direction.

According to the illustrated embodiment, the respective clutch disks 216, 217 are arranged on the same axis center 213, rotated respectively along with the inner support member 214 and the outer support member 215 around the axis center 213 to be able to rotate relative to each other, further, made to be able to be brought into face contact with each other and made to separate from and approach each other in the axial direction by being respectively slid relative to the inner support member 214 and the outer support member 215.

Further, the respective first clutch disks 216 can be cooperatively connected to the power transmitter shaft 17 by way of the inner support member 214 and the respective clutch disks 217 are cooperatively connected to the transmission 30 by way of the outer support member 215.

Further, the clutch 20 includes a stopper 220 for hampering the two clutch disks 216, 217 brought into contact with each other from moving in one direction A of the axial direction to or beyond a predetermined position B, and a clutch spring 222 for exerting an urge force C to the two clutch disks 216, 217 by way of the pressure plate 21 in the one direction A such that the two clutch disks 216, 217 hampered by the stopper 220 are brought into contact with each other.

The stopper 220 can be formed at the inner support member 214, arranged on the axis center 213 in a shape of a circular ring and is made to be able to be brought into face contact with a face of the first clutch disk 216 opposed to the stopper 220 in the axial direction. Further, the pressure plate 221 can be configured in a shape of a circular ring and arranged on the axis center 213, and includes a press face 211a in a shape of a circular ring opposed to the other first clutch disk 216 in the axial direction and made to be brought into face contact therewith. An outer side (one portion) in a diameter direction of the press face 221a and the stopper 220 are opposed to each other in the axial direction.

As shown by FIG. 23, the two clutch disks 216, 217 are exerted with the urge force C by the clutch spring 222 by way of the pressure plate 221 and is hampered from moving in the one direction A to and beyond the predetermined position B by the stopper 220. Therefore, thereby, the two clutch disk 216, 217 are brought into a state of being in contact with each other, that is, the clutch 20 is brought into the connected state.

Further, the clutch 20 includes bias force release device 223 capable of releasing the urge or bias force C of the clutch spring 222 exerted to the two clutch disks 216, 217 by inputting an operating force from outside. The bias force release device 223 can include a shaft member 226 arranged on the axis center 213 and can be made to be rotated relative to the pressure plate 221 around the axis center 213 and the shaft member 226 can be inputted with the operating force.

Further, the clutch 20 includes the actuator 22 for exerting an operating force to the shaft member 226 of the bias force release device 223. The actuator 22 includes the hydraulic cylinder 22 (refer to FIG. 2) and a rack gear set 230 for transmitting operation of the cylinder 22 to the shaft member 226.

As shown by FIG. 24, when the cylinder 22 is operated, the cylinder 22 moves the shaft member 226 of the bias force release device 223 in other direction D opposed to the one direction A in the axial direction by way of the rack gear set 230 while the shaft member 226 of a transmitter torque restriction spring (bias member) 232 is being opposed to the urge force C of the clutch spring 222. Then, by the movement, the urge force C of the clutch spring 222 exerted to the two clutch disks 216, 217 is released to bring about a state in which the two clutch disks 216, 217 are separated from each other. That is, the clutch 20 is brought into the disconnected state.

In FIG. 23, the clutch 20 includes the transmitter torque restriction spring 232 which is a belleville spring for urging the two clutch disks 216, 217 in the other direction D to be brought into contact with each other. The transmitter torque restriction spring 232 is arranged on the axis center 213 by constituting a shape of a circular ring, inwardly fitted to the stopper 220, and the stopper 220 and the transmitter torque restriction spring 232 are arranged in parallel with each other in a diameter direction. Further, an inner side (other portion) in the diameter direction of the pressing face 221a of the pressure plate 221 and the transmitter torque restriction spring 232 are opposed to each other in the axial direction.

According to the configuration of the illustrate embodiment, when there is brought about a free state in which the operating force is not inputted to the bias force release device 223, the two clutch disks 216, 217 are brought into contact with each other by the urge force C of the clutch spring 222 to bring the clutch 20 into the connected state (FIG. 23). In this case, the drive force of the internal combustion engine 16 shown in FIG. 2 is transmitted to the wheel 12 by way of the clutch 20 and the transmission 30 and the riding type vehicle 100 is made to be able to run in a speed change state of the transmission 30 at that occasion.

Next, when the operating portion 52 (52a, 52b) is operated to bring the transmission 30 into a desired speed change state, by the control apparatus 50 inputted with a signal, first, the actuator (clutch actuator) 22 is operated. Successively, the operating force is exerted to the urging force releasing means 223 by the actuator 22 and the urging force releasing means 223 releases the urge force C of the clutch spring 222. Thereby, the clutch 20 is brought into the disconnected state (FIG. 24).

When the clutch 20 is brought into the disconnected state in this way, transmission of the drive force from the power transmitting shaft 17 to the transmission 30 is disconnected, and in the disconnected state, a speed change operation is made to be able to be operated to the transmission 30. Hence, the actuator (shift actuator) 32 is operated by the control apparatus 50 and the speed change clutch 37 of the transmission 30 is operated to be disconnected and connected, thereby, a desired speed change state is achieved.

After the speed change operation operated to the transmission 30, the actuator 22 is operated by the control apparatus 50 and the operating force exerted to the urging force releasing means 223 is released. Then, by the urge force C of the clutch spring 222, the clutch disks 216, 217 are brought into contact with each other again. Therefore, the riding type vehicle 100 can be continued to run in the desired speed change state of the transmission 30.

As described above, when the clutch 20 is brought into the connected state (FIG. 23) from the disconnected state (FIG. 24), the operating force exerted to the urging force releasing means 223 is gradually reduced by operating the actuator 22. Then, contrary thereto, the urge force C exerted to the two clutch disks 216, 217 by the clutch spring 222 is gradually increased, the two clutch disks 216, 217 are moved in the one direction A and are going to be moved up to the predetermined position B.

However, as shown by FIG. 25, the two clutch disks 216, 217 are brought into press contact with the transmitter torque restriction spring 232 before reaching the predetermined position B and started to be exerted with a reaction force E from the transmitter torque restriction spring 232.

Therefore, a force of bringing the two clutch disks 216, 217 into contact with each other is started to be gradually increased before the two clutch disks 216, 217 reach the predetermined position B, by that amount, a contact force can gradually be increased sequentially smoothly and the partial clutch engagement state can easily be brought about pertinently. That is, the transmission torque restricting spring (for example, belleville spring) 232 is provided with a function of bringing about the partial clutch engagement state pertinently.

Therefore, since the partial clutch engagement state can easily be brought about pertinently by the multiplate clutch 20, the clutch can smoothly be brought into the connected state from the disconnected state also by the actuator 22 and the riding type vehicle 100 can smoothly be driven to run in the speed change operation operated to the transmission 30.

Further, the pressure plate 221 for pressing the two clutch disks 216, 217 by the urge force C of the clutch spring 222 is provided, the stopper 220 is made to be opposed to the portion of the pressing face 221a of the pressure plate 221 for pressing the two clutch disks 216, 217 in the axial direction, the transmitter torque restriction spring 232 can be made to be opposed to the other portion of the pressing face 221a in the axial direction, and in the free state of the urge force releasing means 223, a value for a reaction force F of the stopper 220 exerted to the two clutch disks 216, 217 and a value of the reaction force E of the transmitter torque restriction spring 232 can be made to be substantially equal to each other.

Therefore, stresses of respective portions of the two clutch disks 216, 217 produced by the urge force C exerted to the two clutch disks 216, 217 and the two reaction forces E, F opposed to the urge force C are made to be substantially uniform, a partial contact is prevented from being brought about between the two clutch disks 216, 217 and a smooth contact is achieved.

Therefore, since the partial clutch engagement state can easily be brought about pertinently by the multiplate clutch 20, the clutch 20 can further smoothly be brought into the connected state from the disconnected state also by the actuator 22 and the riding type vehicle 100 can smoothly be driven to run in the speed change operation operated to the transmission 30.

Further, according to the clutch 20, since the clutch 20 can smoothly be brought into the connected state from the disconnected state, the riding type vehicle 100 can also be started smoothly.

According to the illustrated embodiment, there are provided the actuator 22 for exerting the operating force to the urge force releasing means 223 and the transmitter torque restriction spring 232 for urging to bring the two clutch disks 216, 217 into contact with each other in the other direction D in the axial direction. Therefore, in a case of bringing the clutch 20 into the connected state from the disconnected state, when the operating force exerted to the bias force release device 223 is gradually reduced by operating the actuator 22, contrary thereto, the urge force exerted to the two clutch disks 216, 217 by the clutch spring 222 is gradually increased and the two clutch disks 216, 217 are moved in the one direction A to be moved to the predetermined position.

However, the two clutch disks are brought into press contact with the transmitting torque restricting spring before reaching the predetermined position and is started to be exerted with the reaction force E from the transmitting torque restricting spring.

Therefore, before the two clutch disks 216, 217 reach the predetermined position, the force of bringing the two clutch disks 216, 217 into contact with each other is started to be increased gradually, by that amount, the contact force can gradually be increased sequentially smoothly and the partial clutch engagement state can easily be brought about pertinently.

Therefore, since the partial clutch engagement state can easily be brought about pertinently by the multiplate clutch 20, the clutch 20 can smoothly be brought into the connected state also by the actuator 22.

Further, the pressure plate 221 for pressing the two clutch disks 216, 217 by the urge force of the clutch spring 222 is provided, the stopper 220 is made to be opposed to the one portion of the pressing face 221a of the pressure plate 221 pressed to the two clutch disks 216, 217 in the axial direction, the transmitter torque restriction spring 232 is made to be opposed to the other portion of the pressing face 221a in the axial direction, and in the free state of the bias force release device 223, the value of the reaction force F of the stopper 220 exerted to the two clutch disks 216, 217 and the value of the reaction force E of the bias force release device 232 are made to be substantially equal to each other.

Therefore, the stresses of the respective portions of the two clutch disks 216, 217 produced by the urge force exerted to the two clutch disks 216, 217 and the two reaction forces opposed to the urge force are made to be substantially uniform, the partial contact is prevented from being brought about between the two clutch disks 216, 217 and the smooth contact is achieved.

Therefore, since the partial clutch engagement state can easily be brought about pertinently by the multiplate clutch 20, the clutch 20 can further smoothly be brought into the connected state from the disconnected state also by the actuator 22.

Further, although the motorcycle 100 shown in FIG. 1 is of the onroad type, the invention is not limited thereto but is applicable also to a motorcycle of an offroad type as described above. Further, "automatic two wheel vehicle" in the specification of the application signifies the motorcycle, including a bicycle attached with a prime mover (motor bike), a scooter, specifically referring to a vehicle turnable by inclining a vehicle body. Therefore, even when at least one of a front wheel and a rear wheel is constituted by two or more of wheels, a three wheel vehicle or a four wheel vehicle (or more wheels vehicle) is constituted by counting a number of tires, these can be included in the "automatic two wheel vehicle". Further, the invention is not limited to the motorcycle but is applicable to other vehicle capable of utilizing the effect of the invention, for example, the invention is applicable to a so-to-speak riding type vehicle including a four wheel buggy (ATV: All Terrain Vehicle) 2000, or a snow mobile other than the motorcycle.

Although the invention has been explained by the preferable embodiments as described above, such a description is not a limited item but naturally, the invention can be modified or changed variously. Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

For reference, below is a summary of the reference numbers used in the description herein.

10 transmission
11 front wheel
12 rear wheel
13 handle
14 fuel tank
15 seat
16 engine
17 power transmitter shaft
18 power transmitter
19 front fork
20 multiplate clutch (clutch)
21 pressure plate
22 clutch actuator
24 clutch actuator
24 cylinder (hydraulic cylinder)
30 transmission
32 shift actuator
34 housing
35 input side member
36 output side member
37 speed changing clutch
50 control apparatus (electronic control portion, ECU)
52 operating portion
52a UP switch
52b DOWN switch
53 clutch control apparatus
56 crankshaft
57 clutch housing
58 clutch boss
59 main shaft
60 first clutch disk
61 second clutch disk
62 pressure plate
66 clutch disengaging rod
66a one end portion
68a worm gear
68b locking portion
69 operating force transmitter mechanism
74 gear
75 shaft
76 lever member
77 shaft
78 stopper
79 connecting portion
82 connecting portion
84 connecting portion main body
85 screw member
86 nut
89 connecting portion main body
90 screw member
91 nut
93 drive lever
94 shaft
96 connecting pin
97 coil spring (bias device)
100 motorcycle (riding type vehicle)
101 pinion gear
102 locking pin
103 drive lever
104 wire
105 clutch lever
110 rider
111 engine rotational number sensor
112 vehicle speed sensor
113 clutch actuator position sensor 114 shift actuator position sensor
115 gear position sensor
119 gear position display portion
120 engine ignition portion
121 fuel injection apparatus
213 axis center
214 inner support member
215 outer support member
216 first clutch disk
217 second clutch disk
220 stopper
221 pressure plate
221a pressing face
223 bias force release device
226 shaft member
230 rack gear set

The invention claimed is:

1. A riding vehicle comprising:
an automatic transmission including a clutch actuator and a shift actuator arranged to execute a gear shift change;
a multiplate clutch controlled by the clutch actuator, the multiplate clutch including a bias member arranged to enlarge a clutch partially engaged region of the multiplate clutch by changing a rate of change in which transmission torque is transmitted by the multiplate clutch; wherein
during the gear shift change, both the clutch actuator and the shift actuator are arranged to operate in an overlapping manner.

2. The riding vehicle according to claim 1, wherein the bias member is a coil spring.

3. The riding vehicle according to claim 1, wherein the bias member is arranged to enlarge the clutch partially engaged region by reducing a rigidity of the multiplate clutch.

4. The riding vehicle according to claim 1, further comprising:
a control apparatus connected to the clutch actuator, the control apparatus being arranged to control the multiplate clutch from a first state of starting to transmit a drive force on a side of an engine by transmitting an operating force to the clutch by way of an operating force transmitting mechanism to a second state of starting to rotate the clutch in synchronism with the side of the engine by making a stroke by a predetermined amount by the clutch actuator; wherein
the bias member and the multiplate clutch are arranged such that when a temperature of the clutch is changed, a first range between a stroke position on a low temperature side and a stroke position on a high temperature side in the first state and a second range between a stroke position on a low temperature side and a stroke position on a high temperature side in the second state are separated from each other.

5. The riding vehicle according to claim 1, further comprising:
a control apparatus connected to the clutch actuator, the control apparatus being arranged to control the multiplate clutch from a first state of starting to transmit a drive force on a side of an engine to a second state of starting to rotate the clutch in synchronism with a side of the engine by transmitting an operating force to the clutch by way of an operating force transmitting mechanism by making a stroke by a predetermined amount by the clutch actuator; wherein
the bias device and the multiplate clutch are arranged such that when the clutch is worn, a first range between a stroke position on a side before wearing of the clutch and a stroke position on a side after wearing of the clutch in the first state and a second range between a stroke position on a side before wearing of the clutch and a stroke position on a side after wearing of the clutch in the second state are separated from each other.

6. The riding vehicle according to claim 1, wherein during an overlapping operation of the clutch actuator and the shift actuator, a gear shift change operation by the shift actuator is executed in the clutch partially engaged region by controlling the clutch actuator.

7. The riding vehicle according to claim 6, wherein a timing of starting the clutch partially engaged region and the gear shift change operation of the shift actuator are controlled to be synchronized.

8. The riding vehicle according to claim 1, wherein the multiplate clutch includes:
first and second clutch disks arranged on a same axis center, the first and second clutch disks arranged to rotate relative to each other around the axis center and to be brought into contact with each other and separated from each other in an axial direction of the axis center and cooperatively connected to a drive side and a driven side;
a stopper arranged to hamper the first and second clutch disks from being brought into contact with each other by moving in a first direction of the axial direction to a predetermined position or further;
a clutch spring arranged to exert an urging force on the first and second clutch disks in the first direction to bring the two clutch disks hampered by the stopper into contact with each other; and
a bias force release device arranged to enable release of the urging force of the clutch spring exerted on the first and second clutch disks by inputting an operating force; wherein
the clutch actuator exerts the operating force on the bias force release device; and
the bias device includes a transmitting torque restriction spring arranged to urge the two clutch disks in a second direction of the axial direction to be brought into contact with each other.

9. The riding vehicle according to claim 1, wherein the clutch actuator is arranged to control the multiplate clutch from a first state of starting to transmit a drive force on a side of an engine to a second state of starting to rotate the multiplate clutch in synchronism with the side of the engine by transmitting an operating force to the clutch by way of an operating force transmitting mechanism by making a stroke of a predetermined amount, and the clutch actuator and the operating force transmitting mechanism are arranged outside of the engine.

10. The riding vehicle according to claim 9, wherein the clutch actuator is an electric motor.

11. The riding vehicle according to claim 1, wherein the clutch actuator is disposed inside of an engine of the riding vehicle.

12. The riding vehicle according to claim 9, wherein the operating force transmitting mechanism includes a first connecting portion provided on a side of the clutch actuator and a second connecting portion provided on a side of the multiplate clutch, the operating force transmitting mechanism includes a first bias member arranged to urge the first and second connecting portions in a separating direction, and when the clutch is disconnected, the multiplate clutch is arranged to be disconnected by making the first and second connecting portions approach each other against an urging force of the first bias member by driving the clutch actuator.

13. The riding vehicle according to claim 1, further comprising an electronic control device, and wherein the riding vehicle is a motorcycle and the clutch actuator and the shift actuator are arranged to be controlled by the electronic control device.

14. The riding vehicle according to claim 1, further comprising an electronic control apparatus electrically connected to the clutch actuator and the shift actuator, wherein the automatic transmission is arranged to execute the gear shift change by an instruction of a driver or an instruction by the electronic control apparatus.

15. The riding vehicle according to claim 1, further comprising:
- an electronic control apparatus electrically connected to the clutch actuator; wherein
- the automatic transmission is arranged to execute the gear shift change through the electronic control apparatus;
- the electronic control apparatus is electrically connected to a sensor arranged to detect a situation of the riding vehicle; and
- the instruction by the electronic control apparatus is carried out in accordance with the situation of the riding vehicle.

* * * * *